(12) United States Patent
Lin

(10) Patent No.: US 12,571,458 B2
(45) Date of Patent: Mar. 10, 2026

(54) LINEAR ACTUATOR WITH CUSHION MECHANISM

(71) Applicant: TIMOTION TECHNOLOGY CO., LTD., New Taipei City (TW)

(72) Inventor: Yu-Chang Lin, New Taipei City (TW)

(73) Assignee: TIMOTION TECHNOLOGY CO., LTD., New Taipei City (TW)

( * ) Notice: Subject to any disclaimer, the term of this patent is extended or adjusted under 35 U.S.C. 154(b) by 0 days.

(21) Appl. No.: 18/424,799

(22) Filed: Jan. 27, 2024

(65) Prior Publication Data

US 2025/0035195 A1     Jan. 30, 2025

Related U.S. Application Data

(60) Provisional application No. 63/528,669, filed on Jul. 25, 2023.

(51) Int. Cl.
*F16H 25/20*     (2006.01)
*A61G 7/018*     (2006.01)

(52) U.S. Cl.
CPC ......... *F16H 25/2021* (2013.01); *A61G 7/018* (2013.01); *F16H 2025/2071* (2013.01)

(58) Field of Classification Search
CPC ......... F16H 25/2021; F16H 2025/2071; A61G 7/018

See application file for complete search history.

(56) References Cited

U.S. PATENT DOCUMENTS 5,329,657 A     7/1994  Bartley et al.

| | | |
|---|---|---|
| 5,346,045 A | 9/1994 | Bennett et al. |
| 2001/0029797 A1 | 10/2001 | Lange et al. |
| 2012/0240696 A1* | 9/2012 | Bastholm ............. A47C 20/041 |
| | | 74/89.38 |

FOREIGN PATENT DOCUMENTS

| | | |
|---|---|---|
| DE | 102014019729 A1 | 12/2015 |
| DE | 202021101750 U1 | 5/2021 |
| DE | 202022100838 U1 | 4/2022 |
| DE | 112020005715 T5 | 9/2022 |
| JP | 2013513073 A | 4/2013 |

OTHER PUBLICATIONS

Office Action dated Dec. 10, 2024 of the corresponding Japan patent application No. 2024-001672.

* cited by examiner

*Primary Examiner* — Minnah L Seoh
*Assistant Examiner* — Gregory T Prather
(74) *Attorney, Agent, or Firm* — HDLS IPR SERVICES; Chun-Ming Shih

(57)     ABSTRACT

A linear actuator with a cushion mechanism includes: an actuator body (10) having a motor (13), a lead screw (151), an outer pipe (152) and a retractable pipe (153), the lead screw (151) is driven by the motor (13), the retractable pipe (153) has a screw nut (157); a rapid release mechanism (30) disposed on the lead screw (151) and releasing a driving relation of the motor (13) and the lead screw (151); and a cushion mechanism (50) disposed in the actuator body (10) and having an elastic member (51) and a deceleration structure (53). When the rapid release mechanism (30) is released, the lead screw (151) rotates while the retractable pipe (153) being loaded, the screw nut (157) compresses the elastic member (51) to make the deceleration structure (53) generate a brake, thus a rotation speed of the lead screw (151) is lowered.

24 Claims, 21 Drawing Sheets

LINEAR ACTUATOR WITH CUSHION MECHANISM

CROSS-REFERENCE TO RELATED APPLICATION

This patent application claims the benefit of U.S. Provisional Patent Application No. 63/528,669, filed Jul. 25, 2023, which is incorporated by reference herein

BACKGROUND OF THE DISCLOSURE

Technical Field

The present disclosure relates to a linear actuator technical field, especially to a linear actuator with a cushion mechanism.

Description of Related Art

A related-art linear actuator is disposed in an electric nursing bed, a treadmill or a wheelchair, and used to adjust and change the elevation angle and the height, thus the related-art linear actuator is commonly known by consumers and fabricators.

U.S. Patent No. U.S. Pat. No. 5,329,657 has disclosed a quick release coupling for head section of a hospital bed including a coupling support. The support has a fowler portion movable between a horizontal and an inclined positions relative to a frame of the bed. The frame of the bed has a reversible electric drive motor, through a reduction gearing arrangement and a releasable coupling mechanism, can rotatably drive a threaded shaft. A nut is engaged with the shaft and prevented from rotating with the shaft. A linkage arrangement couples the nut to the fowler portion to allow a reciprocal movement of the fowler portion in response to a reciprocal movement of the nut along the shaft. A manual release is disposed on the fowler portion. When being actuated, disengages the releasable coupling mechanism is disengaged, thus the threaded shaft is free to rotate independently of the motor and the gearing arrangement.

U.S. Patent No. U.S. Pat. No. 5,346,045 has disclosed a linear actuator having a reversible electric motor driving a screw-threaded shaft engaging a roller nut. A tubular housing attached connected to the nut has an internal seating member and load securing lugs at distal ends thereof. A hydraulic shock absorbing unit, providing a linear deceleration, is normally held in the most relaxed condition between the seating member and an end of a spacer tube butting against the nut. When the nut is within the shock absorbing stroke distance of the driven end of the shaft, the free end of the shaft compresses the shock absorbing unit against the seating. When the nut is within shock absorbing stroke distance of the free end of the shaft, a ring is engaged with a stop collar, thereby holding the shock absorber body at a fixed distance from the free end of the shaft, and the spacer tube compresses the shock absorber unit. A centrifugal braker is provided on a drive coupling pulley, and restrains rotation of the shaft above a predetermined rate.

U.S. Patent Publication No. US20120240696A1 has as disclosed a linear actuator with a reversible electric motor, which over a transmission drives a non-self-locking spindle by which a tube-shaped positioning element can be moved axially, in that it with one end is connected to a spindle nut on a spindle. The actuator has a quick release for releasing the tube-shaped positioning element from the electric motor and the part of the transmission that lies from the motor to the quick release such that the spindle is set to rotate by the load on the tube-shaped positioning element. The actuator further has braking means for controlling the speed of the tube-shaped positioning element during the outer load, when the quick release is activated. The braking means consists of a centrifugal brake, by which it is possible to provide a construction, wherein the lowering speed is self-controlled when the quick release is activated.

SUMMARY OF THE DISCLOSURE

The present disclosure is to provide a linear actuator with a cushion mechanism, in which a rotation speed of a rotating lead screw is lowered by a deceleration structure, thus an impact force generated when a retractable pipe retracts into an outer pipe is reduced.

Accordingly, the present disclosure provides a linear actuator with a cushion mechanism, which includes an actuator body, a rapid release mechanism and a cushion mechanism. The actuator body includes a motor, a lead screw, an outer pipe and a retractable pipe. The lead screw is driven by the motor to rotate. The outer pipe sheathes at an outer side of the retractable pipe. The retractable pipe has a screw nut screwed with the lead screw for transmission. The rapid release mechanism is disposed on the lead screw and used to release a driving relation of the motor and the lead screw. The cushion mechanism is disposed in the actuator body and has an elastic member and a deceleration structure. Wherein, when the rapid release mechanism is in a released status, the lead screw rotates when the retractable pipe is subjected to a load, the screw nut compresses the elastic member to make the deceleration structure be driven to generate a brake, thus a rotation speed of the rotating lead screw is lowered via the deceleration structure.

Accordingly, the present disclosure provides a linear actuator with a cushion mechanism, which includes an actuator body, a rapid release mechanism and a cushion mechanism. The actuator body includes a motor, a lead screw and a retractable pipe. The lead screw is driven by the motor to rotate. The retractable pipe has a screw nut screwed with the lead screw for transmission. The rapid release mechanism is disposed on the lead screw and used to release a driving relation of the motor and the lead screw. The cushion mechanism is disposed in the actuator body and has an elastic member and a declaration structure. The declaration structure has a rotation gear driven by the lead screw and a brake structure disposed corresponding to the rotation gear. Wherein, when the screw nut compresses the elastic member and the elastic member is deformed to make the rotation gear be mechanically connected to the brake structure, a rotation speed of the rotating lead screw is lowered via the brake structure braking the rotation gear.

Accordingly, the present disclosure provides a linear actuator with a cushion mechanism, which includes an actuator body and a cushion mechanism. The actuator body includes a motor, a lead screw and a retractable pipe. The lead screw is driven by the motor to rotate. The retractable pipe has a screw nut screwed with the lead screw for transmission. The cushion mechanism is disposed in the actuator body and has an elastic member and a deceleration structure. The deceleration structure has a rotation gear driven by the lead screw and a brake structure disposed corresponding to the rotation gear. Wherein, when the screw nut compresses the elastic member and the elastic member is deformed to make the rotation gear be mechanically connected to the brake structure, a rotation speed of the rotating lead screw is lowered via the brake structure braking the rotation gear.

Advantages achieved by the present disclosure are as follows. With a recovery member, the engagement of the rotation gear and the rotation stopping member is released. With a screw cap, an impacting action force of the screw nut is evenly transferred to the elastic member. With a front position limiting ring and a rear position limiting ring, a stably positioning and fastening effect is provided to the elastic member. With a first concave/convex surface and a second concave/convex surface of the rotation gear and the rotation stopping member, the engaging stability between the rotation gear and the rotation stopping member is enhanced. With an inner mounting block of the rotation gear working with a U-shaped notch of the direction guiding unit, the fabricating procedure is simplified and the complicated assembling process is also simplified. With a thrust bearing, a relative friction between a distal surface of the elastic member and the rotation gear is prevented, and improper situations of generating scratches or noises are avoided. With an offset gear and the rotation stopping member being parallelly arranged, the invalid stroke of the retractable pipe is shortened.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION OF THE DISCLOSURE

The technical contents of this disclosure will become apparent with the detailed description of embodiments accompanied with the illustration of related drawings as follows. It is intended that the embodiments and drawings disclosed herein are to be considered illustrative rather than restrictive.

Please refer from FIG. 1 to FIG. 5, the present disclosure provides a linear actuator with a cushion mechanism. The linear actuator with the cushion mechanism is mainly applied in a nursing bed or a medical bed (not shown in figures), and a front portion of the nursing bed or medical bed generates an elevating or horizontally lying movement by operating the linear actuator. Especially, when a patient requires to be in a lying position to be processed with an emergency rescuing operation such as an electric shock, an impact force generated when the front portion of the nursing bed or the medical bed rapidly descends is reduced by the linear actuator, thus damages to the patient is minimized and more comforting feelings are provided to the patient.

The linear actuator mainly includes an actuator body 10, a rapid release mechanism 30 and a cushion mechanism 50.

Figure 1:
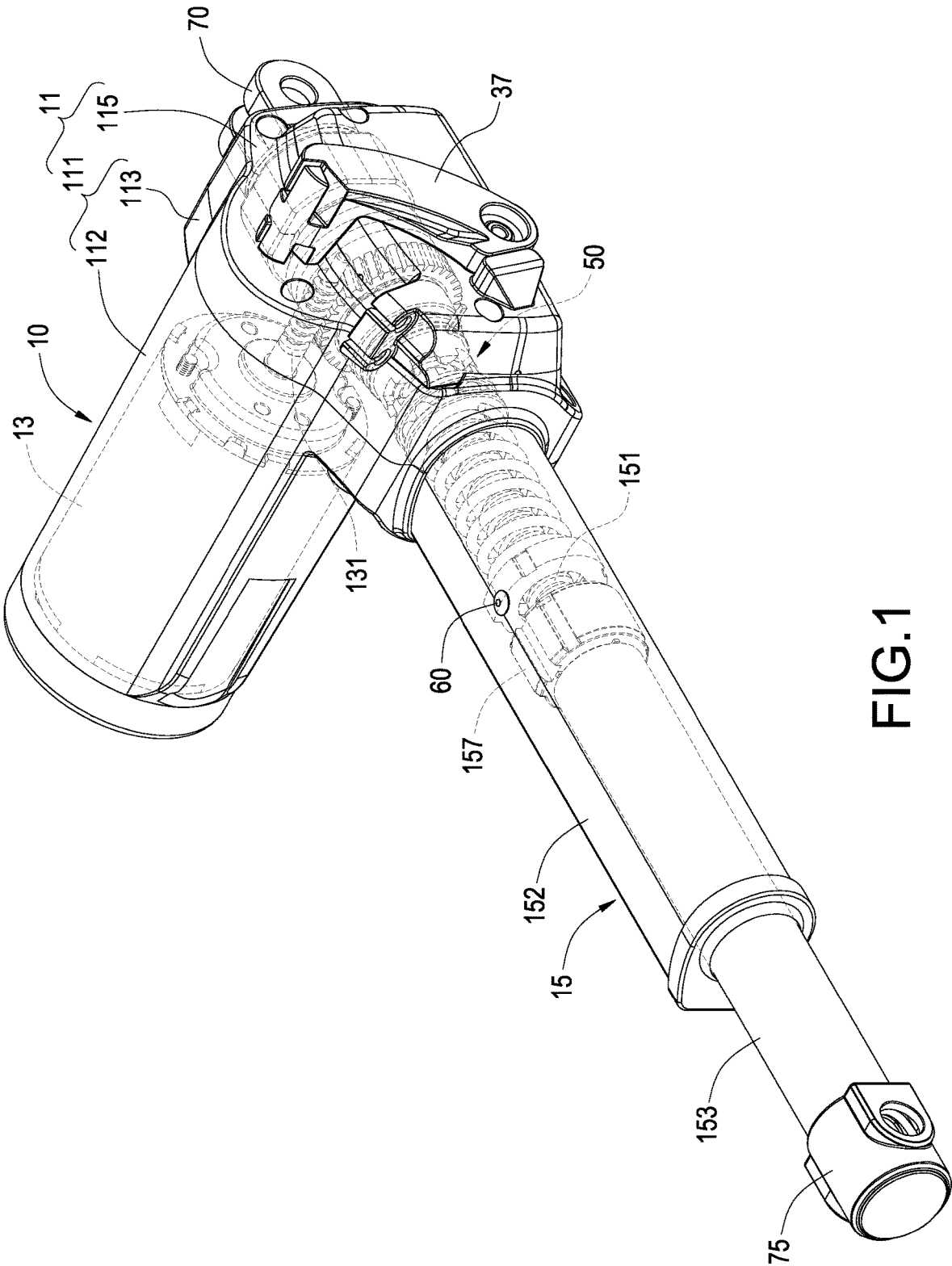
FIG. 1 is a perspective view showing the assembly according to the first embodiment of the present disclosure.

Please refer to FIG. 1, the actuator body 10 mainly includes a case 11 a motor 13 and a transmission mechanism 15. The case 11 mainly includes a bottom case member 111 and an upper case member 115. The upper case member 115 and the lower case member 111 are made of a plastic material. The lower case member 111 is composed of a round tubular segment 112 and a half case cover 113 formed and extended from one end of the round tubular segment 112. One end of the round tubular segment 112 away from the half case cover 113 is in a sealed status. The upper case member 115 is a half case cover which is correspondingly engaged with the half case cover 113 of the lower case member 111. Fastening components, for example screws, are provided between the lower case member 111 and the upper case member 115 for a purpose of combining and fastening.

The motor 13 is disposed in the round tubular segment 112 of the lower case member 111. The motor 13 has a worm 131. The worm 131 generates normal and reverse rotations by the combination and operation of the components, for example magnetic poles a coil and a current, in the motor 13.

Figure 2:
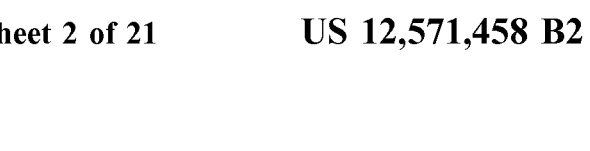
FIG. 2 is a schematic view showing the assembly of a part of the components according to the first embodiment of the present disclosure.
Figure 4:
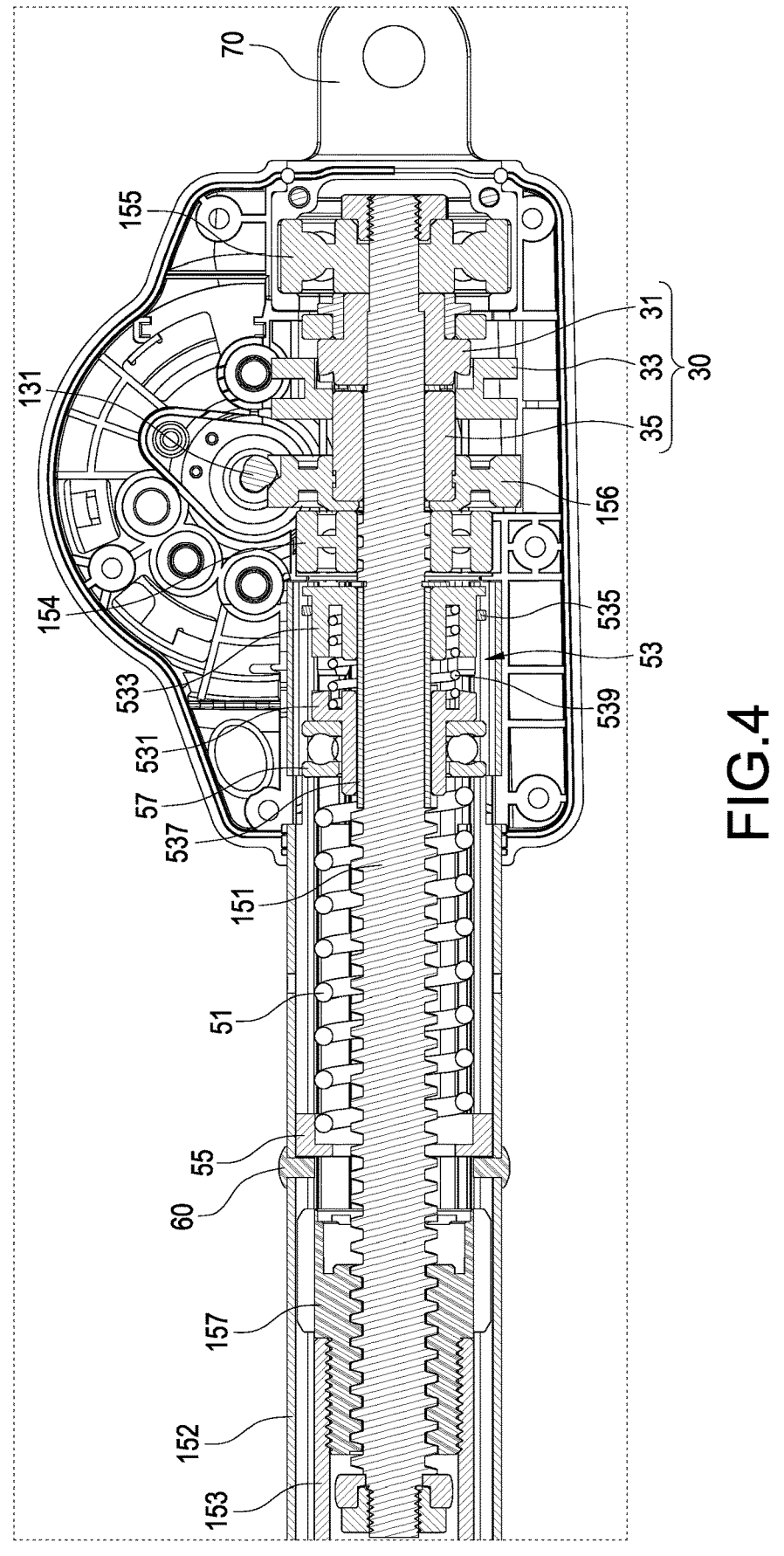
FIG. 4 is a cross-sectional view showing the assembly according to the first embodiment of the present disclosure.
Figure 5:
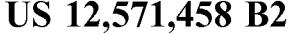
FIG. 5 is a cross-sectional view showing an operating status according to the first embodiment of the present disclosure.

Please refer to FIG. 2, FIG. 4 and FIG. 5, the transfer mechanism 15 mainly includes a lead screw 151, an outer pipe 152 and a retractable pipe 153. A rear part of the lead screw 151 is supported in the lower case member 111 by the sheathing of a front bearing 154 and a rear bearing 155 as shown in FIG. 4 and FIG. 5, and the rest part of the lead screw 151 protrudes out of the case 11. A worn gear 156 mutually engaged with and corresponding to the worm 131 sheathes the lead screw 151 and is located at the rear side of the front bearing 154. In this embodiment, the lead screw 151 is s non-self-locking lead screw, in other rods when the retractable pipe 153 is limited to generate rotations, the lead screw 151 freely rotates relative to the retractable pipe 153 under a situation of the retractable pipe 153 being subjected to an axial push force or a pressing force, thus the retractable pipe 153 generates a linear movement to retract into the outer pipe 152.

The outer pipe 152 is a hollow pipe member. The outer pipe 152 sheathes along an outer circumference of the lead screw 151 to support the retractable pipe 153. One end of the outer pipe 152 is enclosed and fastened by the lower case member 111 and the upper case member 115.

The retractable pipe 153 sheathes the outer circumference of the lead screw 151 and is located in the outer pipe 152. One end of the retractable pipe 153 is connected to a screw nut 157, and the retractable pipe 153 and the lead screw 151 are mutually screwed for transmission via the screw nut 157. An outer circumference of the screw nut 157 is disposed with a groove and a block (not shown in figures) which are mutually mounted with the outer pipe 152, thus the screw nut 157 and the retractable pipe 153 may only linearly move in the outer pipe 152 and may not rotate.

Please refer to FIG. 4 and FIG. 5, the rapid release mechanism 30 mainly includes a position gear 31, a clutch gear 33 and a guide unit 35. The position gear 31, the clutch gear 33 and the guide unit 35 are substantially formed as a round tubular member. The position gear 31 sheathes and is fastened on the lead screw 151, thus the position gear 31 rotates with the lead screw 151. The clutch gear 33 sheathes the lead screw 151 via the guide unit 35 and located at one side of the position gear 31, and the clutch gear 33 axially moves thereon by a guiding effect provided by the guide unit 35. One side of the clutch gear 33 is disposed with a plurality of key slots (not shown in figures), and an outer circumference of the position gear 31 is disposed with a plurality of convex key (not shown in figures); with the same principle, each of the convex keys and each of the key slots may be interchangeably disposed between the position gear and the clutch gear. Each of the convex keys is mounted in each of the key slots, thus the clutch gear 33 is operated to generate an engaging or a separating motion corresponding to the position gear 31.

According to this embodiment, the rapid release mechanism 30 further includes a pull unit 37 pivotally connected at an outer side of the upper case member 115 as shown in FIG. 1. The pull unit 37 is connected to the clutch gear 33 by a connection component (not shown in figures) disposed in the upper case member 115. By operating the pull unit 37, the clutch gear 33 slides on the guide unit 35 and performs the engaging or the separating motion corresponding to position gear 31.

The lead screw 151 is driven by the engagement between the worm 131 of the motor 13 and the worm gear 156. When the clutch gear 33 and the position gear 31 are engaged, the lead screw 151 is driven to rotate by the position gear 31, the clutch gear 33 and the guide unit 35. When the clutch gear 33 and the position gear 31 are separated, the lead screw 151 and the position gear 31 freely rotate by a load applied to the retractable pipe 153, at this moment the clutch gear 33, the guide unit 35 and the worm gear 156 are restrained by the worm 131 and no rotation is generated.

Figure 3:
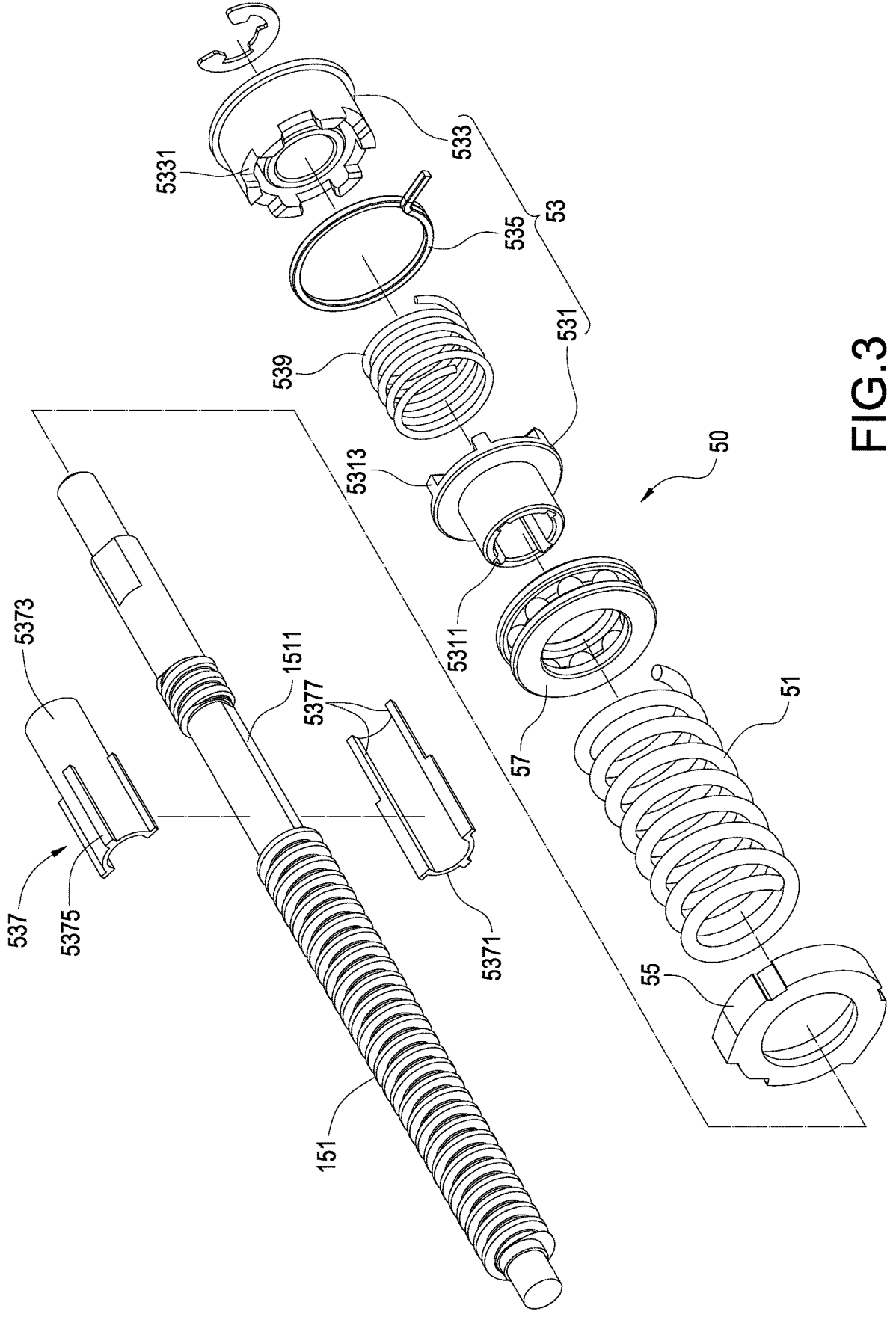
FIG. 3 is an exploded view showing a part of the components according to the first embodiment of the present disclosure.

Please refer to FIG. 3, the cushion mechanism 50 is disposed on the lead screw 151. According to this embodiment, the cushion mechanism 50 is located between the screw nut 157 and the worm gear 156. The cushion mechanism 50 mainly includes an elastic member 51 and a deceleration structure 53. In this embodiment, the elastic member 51 is a compression spring. In this embodiment, the deceleration structure 53 includes a rotation gear 531, a rotation stopping member 533 and a brake member 535. According to this embodiment, the rotation stopping member 533 and the brake member 535 are defined as a brake structure. In this embodiment, the shape of the rotation gear 531 and that of the rotation stopping member 533 are substantially formed in a round tubular shape, here is not intended to be limiting. The rotation gear 531 is disposed close to the screw nut 157. The rotation stopping member 533 is disposed at one side of the rotation gear 531 away from the screw nut 157. The brake member 535 sheathes an outer circumference of the rotation stopping member 533. In this embodiment, the brake member 535 is a spring, here is not intended to be limiting and one end of the brake member 535 is fastened on the case 11 of the actuator body 10.

In some embodiments, a plurality of convex keys 5313 are disposed on a distal surface of the rotation gear 531 facing toward the rotation stopping member 533. A plurality of key slots 5331 are formed on a distal surface of the rotation stopping member 533 facing toward the rotation gear 531. Each of the key slots 5331 is arranged corresponding to each of the convex keys 5313. Each of the key slots 5331 and each of the convex keys 5313 are operated to be engaged or separated. With the same principle, each of the convex keys 5313 and each of the key slots 5331 may be interchangeably disposed between the rotation stopping member 533 and the rotation gear 531.

According to this embodiment, the deceleration structure 53 further includes a direction guiding unit 537 sheathing the lead screw 151 and rotating with the lead screw 151. The rotation gear 531 and the rotation stopping member 533 sheathe the direction guiding unit 537. The direction guiding unit 537 mainly includes a lower housing 5371 and an upper housing 5373. The upper housing 5373 is correspondingly engaged with the lower housing 5371 to jointly sheathe the lead screw 151. A first position surface 1511 is disposed on a circumferential surface of the lead screw 151. A second position surface 5377 is disposed in the upper housing 5373 and the lower housing 5371. The direction guiding unit 537 rotates with the lead screw 151 by the first position surface 1511 and the second position surface 5377 being mutually mounted and positioned.

A plurality of guide strips 5375 are extended from a circumferential surface of the direction guiding unit 537. A plurality of guide slots 5311 are formed on an inner wall of the rotation gear 531. Each of the guide strips 5375 is correspondingly mounted in each of the guide slots 5311. As such, the direction guiding unit 537 drives the rotation gear 531 to rotate with the direction guiding unit 537 by each of the guide strips 5375 of the direction guiding unit 573 being mounted in each of the guide slots 5311. The rotation stopping member 533 sheathes a zone of the direction guiding unit 537 where the guide strips 5375 are not disposed. When the rotation gear 531 is not actuated by the elastic member 51, the rotation stopping member 533 is not mechanically connected to the rotation gear 531, at this moment the rotation stopping member 533 is restrained by the brake member 535 and not rotate with the lead screw 151 and the direction guiding unit 537. Only after the rotation gear 531 is pushed by the elastic member 51, the rotation gear 531 is mechanically connected to the rotation stopping member 533 (the mechanical connection is defined as each of the convex keys 5313 is correspondingly mounted and combined in each of the key slots 5331: with the same principle, a combination generated by a manner such as friction may also be provided). The rotation stopping member 533 stops the rotation gear 531 from rotating by the rotation stopping member 533 being restrained by the brake member 535. The amount of the guide slot and that of the guide strip may be one.

According to this embodiment, the deceleration structure 53 further includes a recovery member 539 located between the rotation gear 531 and the rotation stopping member 533. With the recovery spring 539, when the rotation gear 531 is not pushed by the elastic member 51, the engagement of the rotation gear 531 and the rotation stopping member 533 is released. With the same principle, the recovery member 539 may be in a status of being disposed at the inside or the outside of the rotation gear 531 or the rotation stopping member 533.

According to this embodiment, the cushion mechanism 50 further includes a screw cap 55 sheathing one end of the elastic member 51 away from the deceleration structure 53. When the screw nut 157 directly impacts the elastic member 51, an impacting action force is evenly transferred to the elastic member 51 via the screw cap 55.

According to this embodiment, the cushion mechanism 50 further includes a thrust bearing 57 sheathing an outer circumference of the rotation gear 531. Because the rotation gear 531 rotates with the lead screw 151, the elastic member 51 does not generate any rotation via the thrust bearing 57. After the elastic member 51 is compressed and deformed by the screw nut 157, a relative friction between a distal surface of the elastic member 51 and the rotation gear 531 is prevented by the thrust bearing 57, and improper situations of generating scratches or noises are avoided. With the same principle, the thrust bearing 57 may be replaced by a pad.

In some embodiments, at least one position limiting member 60 is further provided. The at least one position limiting member 60 penetrates and fastens on the outer pipe 152 to limit the moving stroke of the screw cap 55 and/or the elastic member 51.

The linear actuator with the cushion mechanism provided by the present disclosure further includes a rear supporter 70 and a front supporter 75. The rear supporter 70 is disposed at a rear side of the rear bearing 155 and clipped and fastened by the upper case member 115 and the lower case member 111. The front supporter 75 is sheathing a distal part of the retractable pipe 153 away from the screw nut 157.

When in use, the clutch gear 33 and the position gear 31 are separated by operating the pull unit 37, with the weight of the patient himself/herself or a pressing force applied by a medical personnel to the front portion of the nursing bed or the hospital bed, the screw nut 157 drives the lead screw 151 to generate rotations after the retractable pipe 153 is subjected to the aforesaid load, and then the retractable pipe 153 retracts into the outer pipe 152, at a distal location of the moving stroke of the retractable pipe 153, the elastic member 51 generates a compressed deformation by the screw nut 157 pushing the screw cap 55 and the elastic member 51: then, the rotation gear 531 is pushed by the compression force generated after the elastic member 51 is deformed to move toward the rotation stopping member 533, at this moment each of the convex keys 5313 of the rotation gear 531 is mounted in each of the key slots 5331 of the rotation stopping member 533, thus the rotation gear 531 drives the rotation stopping member 533 to rotate with the rotation gear 531. With the brake member 535 tightening and restraining the rotation stopping member 533, the rotation stopping member 533 stops the rotation gear 531 and the lead screw 151 from rotating, thus the rotating speed of the lead screw 151 is decelerated and the moving speed of the retractable pipe 153 retracting into the outer pipe 152 is lowered.

Figure 6:
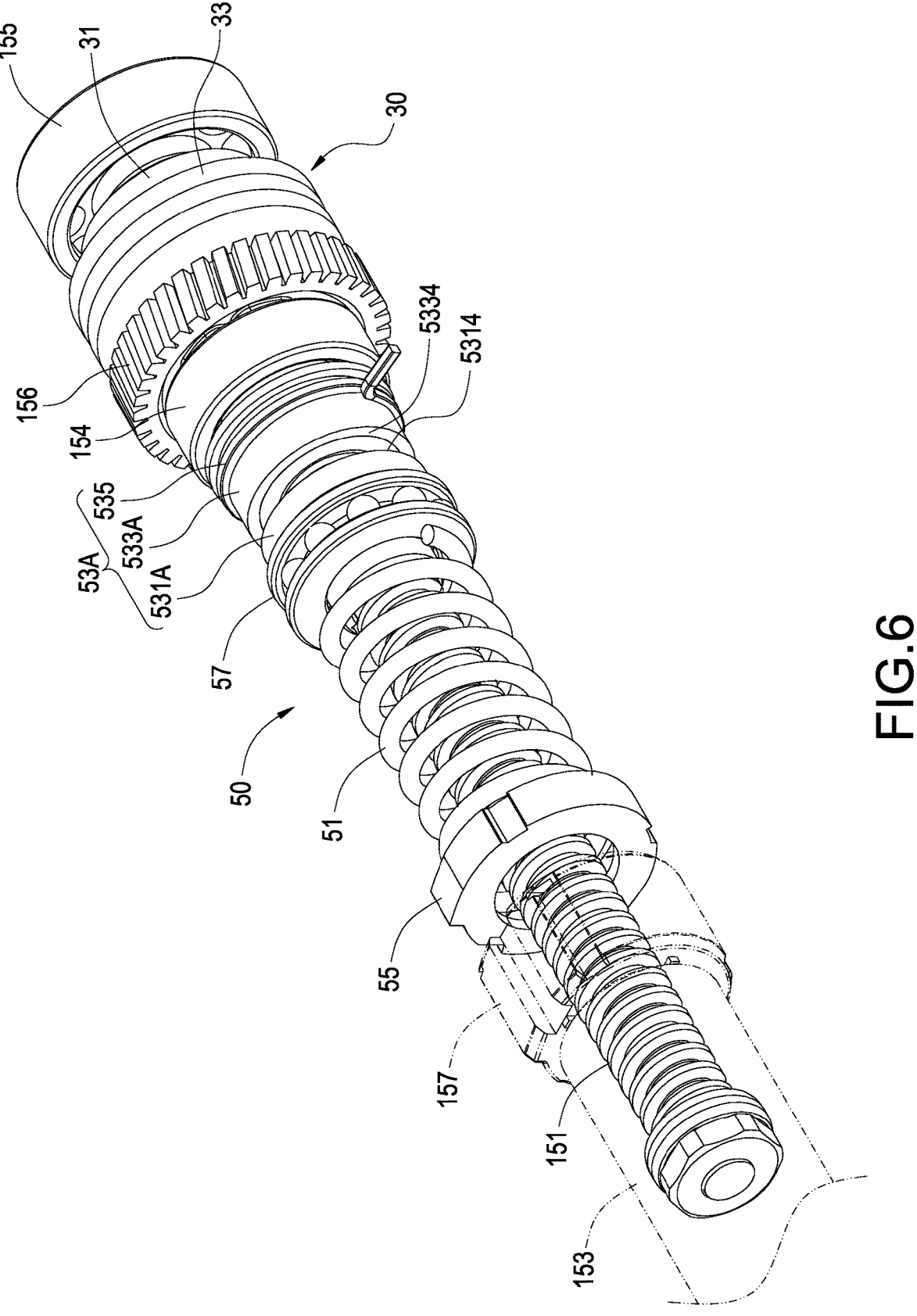
FIG. 6 is a schematic view showing the assembly of a part of the components according to the second embodiment of the present disclosure.
Figure 7:
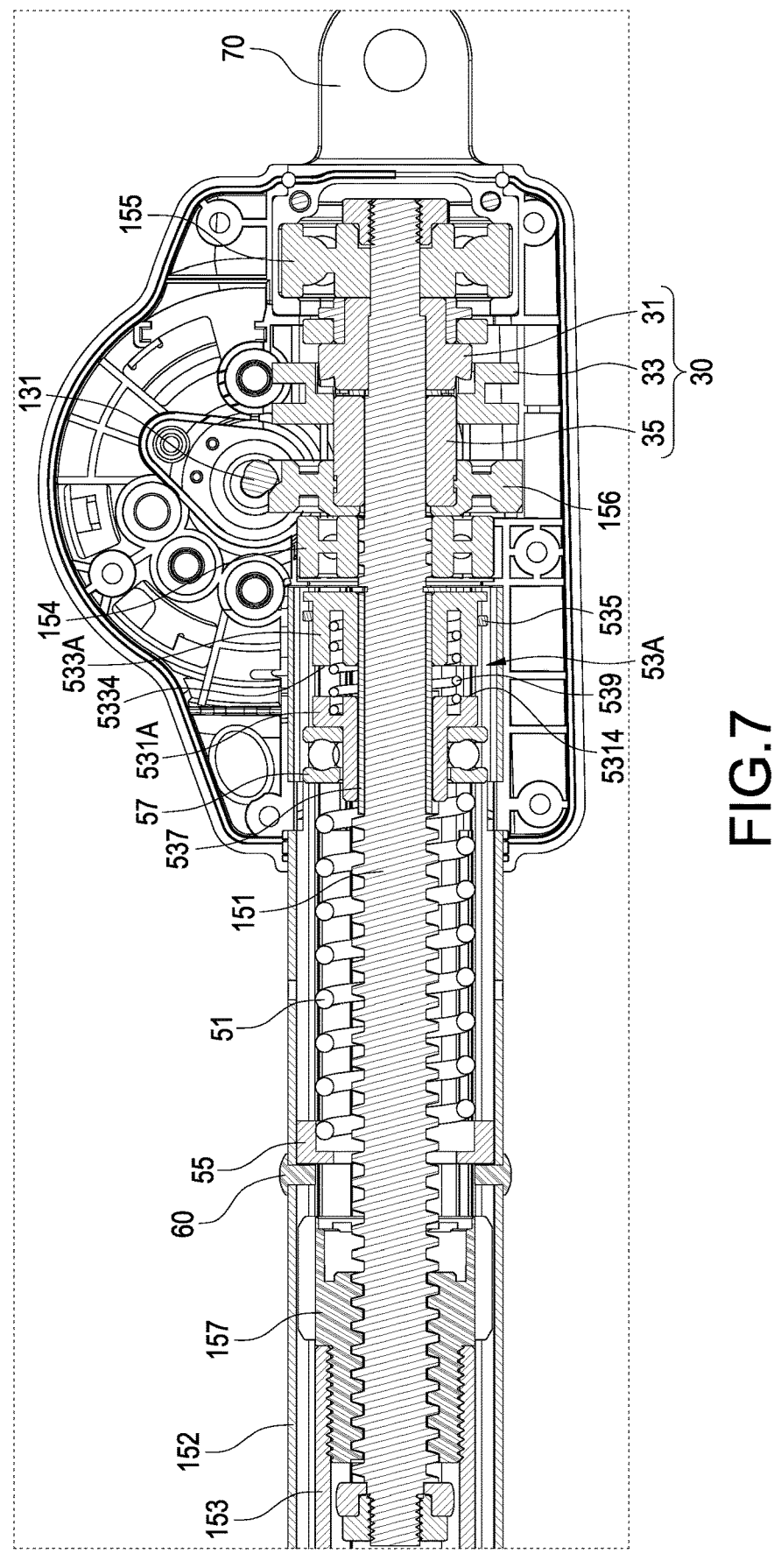
FIG. 7 is a cross-sectional view showing the assembly according to the second embodiment of the present disclosure.
Figure 8:
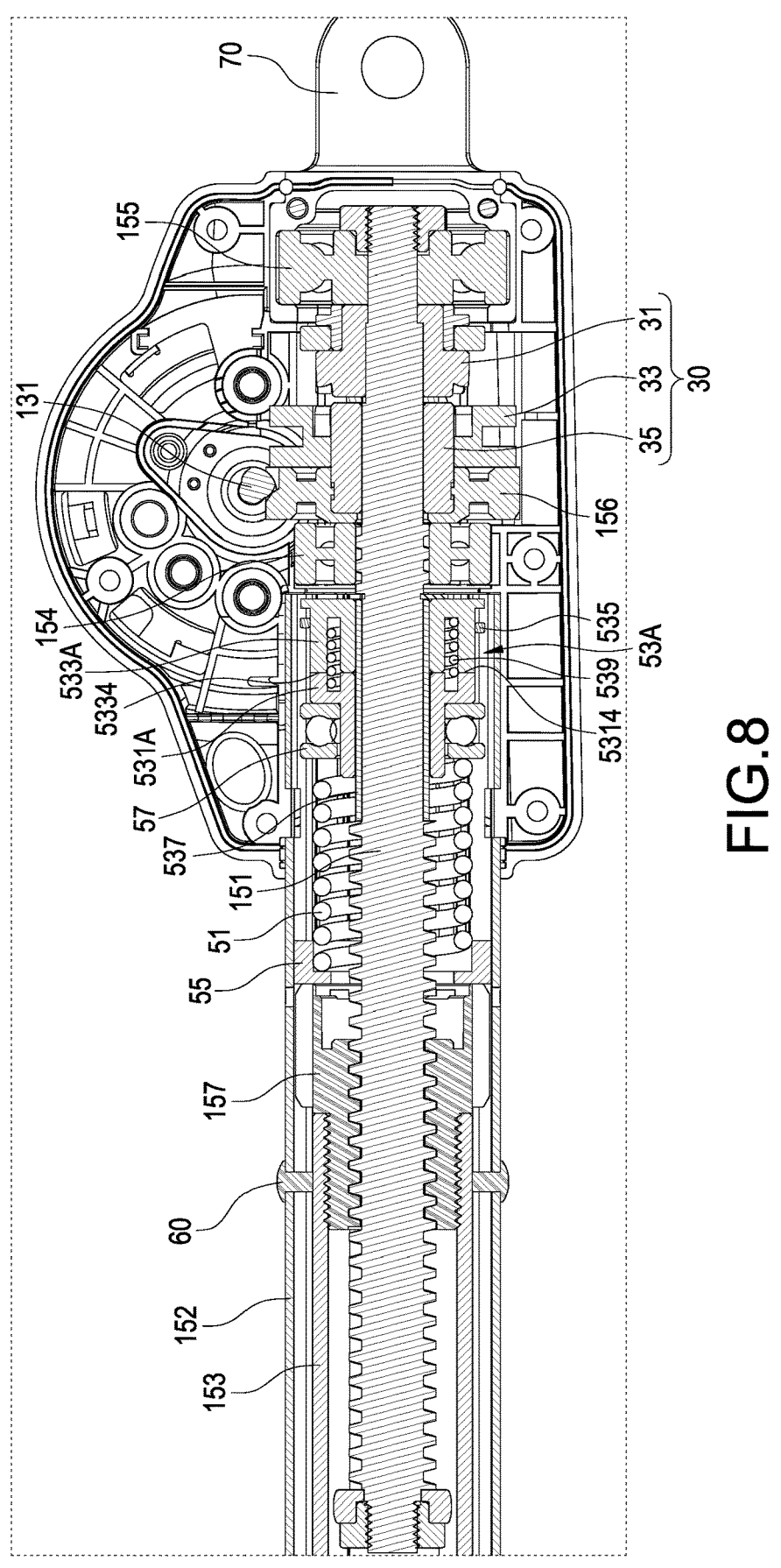
FIG. 8 is a cross-sectional view showing an operating status according to the second embodiment of the present disclosure.

Please refer from FIG. 6 to FIG. 8, the structure of the linear actuator with the cushion mechanism disclosed in this embodiment is substantially the same as that of the linear actuator with the cushion mechanism disclosed in the first embodiment. The differences between this embodiment and the first embodiment are as follows. According to this embodiment, a deceleration structure 53A mainly includes a rotation gear 531A, a rotation stopping member 533A and the brake member 535. A first friction surface 5314 is formed on a distal surface of the rotation gear 531A facing toward the rotation stopping member 533A. A second friction surface 5334 is formed on a distal surface of the rotation stopping member 533A facing toward the rotation gear 531A. The driving and rotating are provided by the friction between the first friction surface 5314 and the second friction surface 5334.

Figure 9:
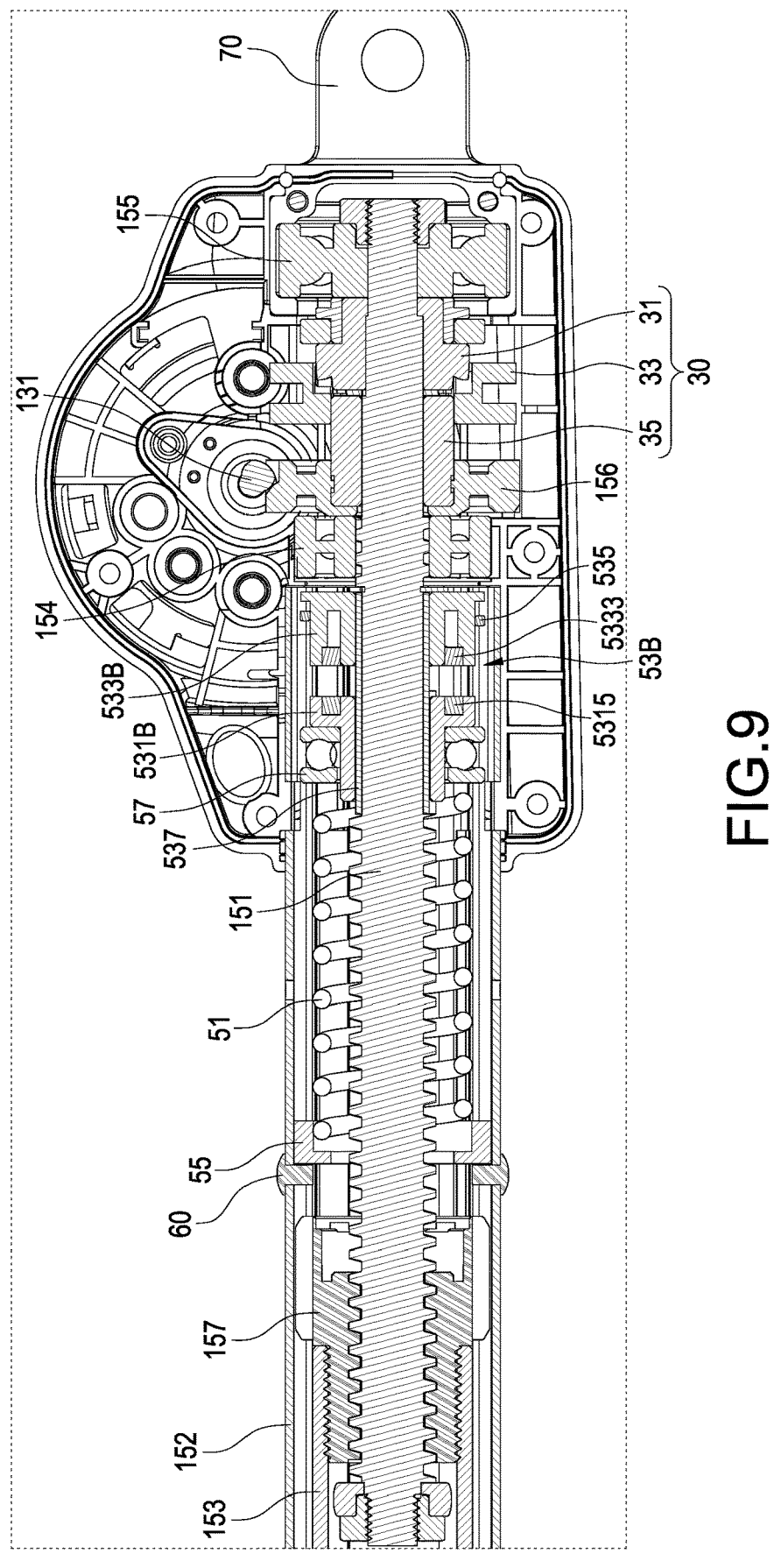
FIG. 9 is a cross-sectional view showing the assembly according to the third embodiment of the present disclosure.
Figure 10:
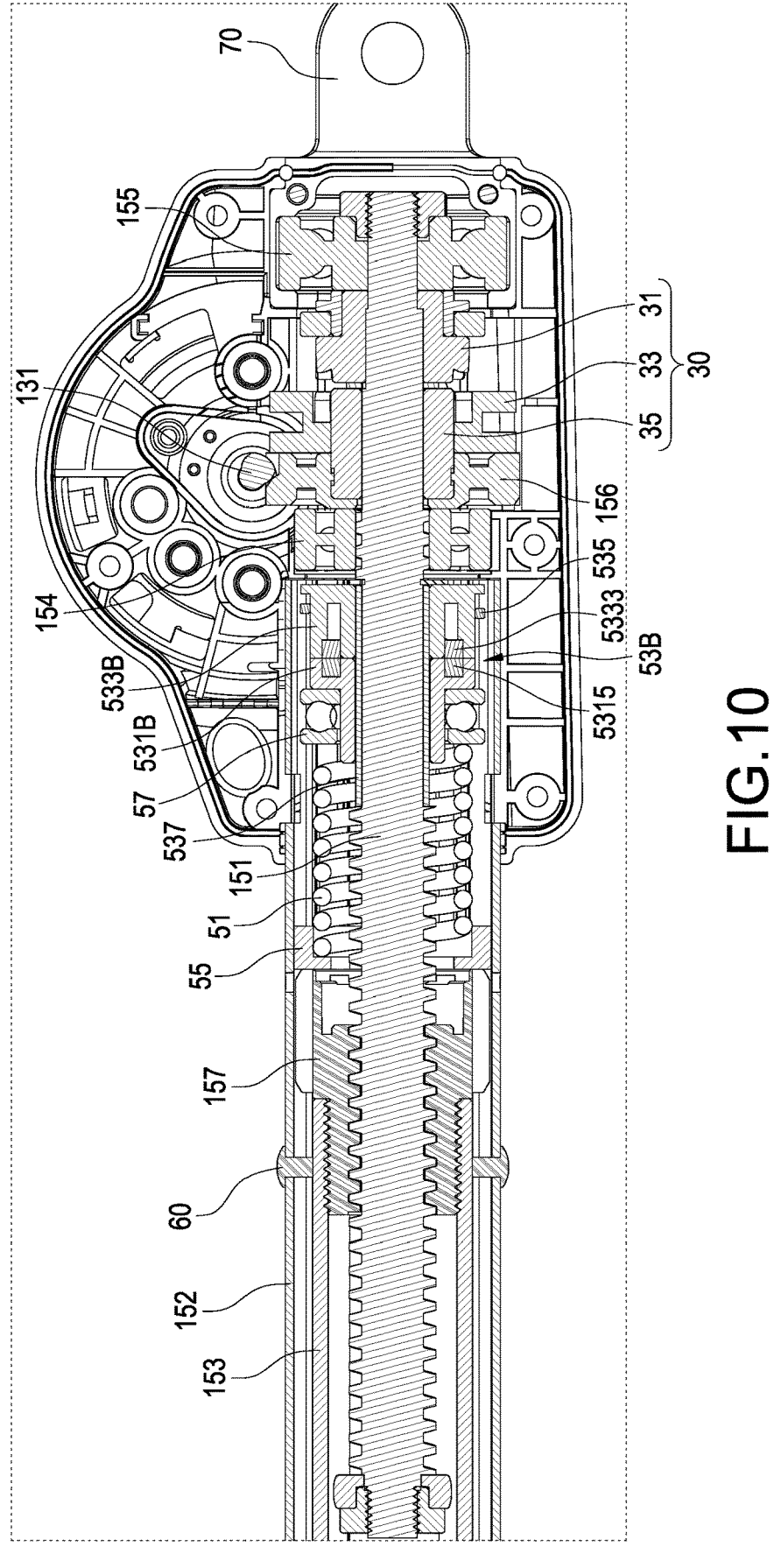
FIG. 10 is a cross-sectional view showing an operating status according to the third embodiment of the present disclosure.

Please refer from FIG. 9 and FIG. 10, the structure of the linear actuator with the cushion mechanism disclosed in this embodiment is substantially the same as that of the linear actuator with the cushion mechanism disclosed in the aforesaid embodiments. The differences between this embodiment and the aforesaid embodiments are as follows. According to this embodiment, a deceleration structure 53B mainly includes a rotation gear 531B, a rotation stopping member 533B and the brake member 535. A first magnet 5315 is disposed in the rotation gear 531B, and a second magnet 5333 is disposed in the rotation stopping member 533B. In this embodiment, a recovery member is composed of the first magnet 5315 and the second magnet 5333. The driving and rotating between the rotation gear 531B and the rotation stopping member 533B are provided by a friction effect generated between distal surfaces thereof. With the same magnetic pole repulsing principle between the first magnet 5315 and the second magnet 5333, the rotation gear 531B is not mechanically connected to the rotation stopping member 533B when the rotation gear 531B is not pushed by the elastic member 51. In some embodiments, corresponding distal surfaces of the rotation gear 531B and the rotation stopping member 533B are driven to rotate by the combination of a convex and concave structure or keys and slots.

Figure 11:
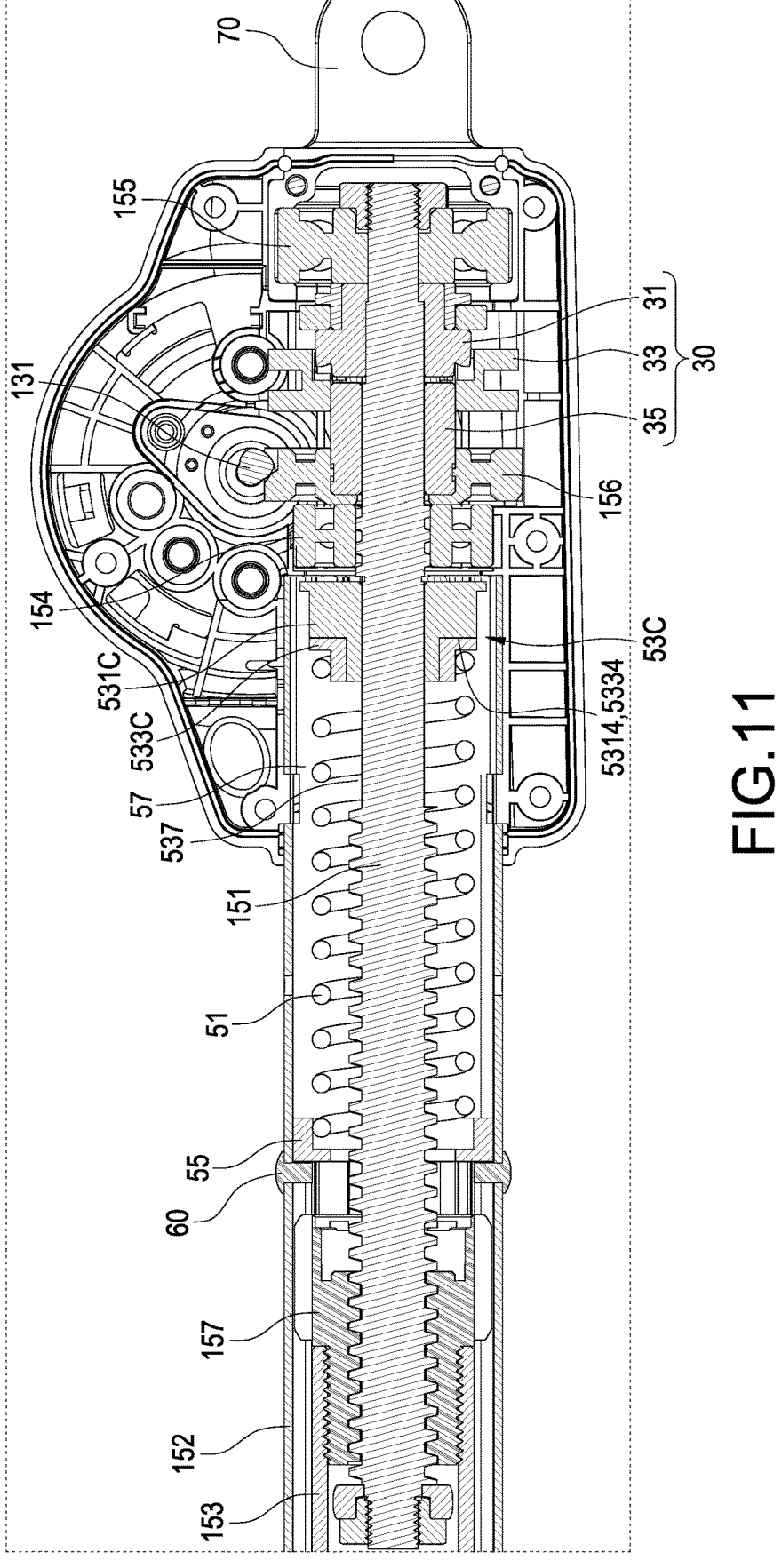
FIG. 11 is a cross-sectional view showing the assembly according to the fourth embodiment of the present disclosure.
Figure 12:
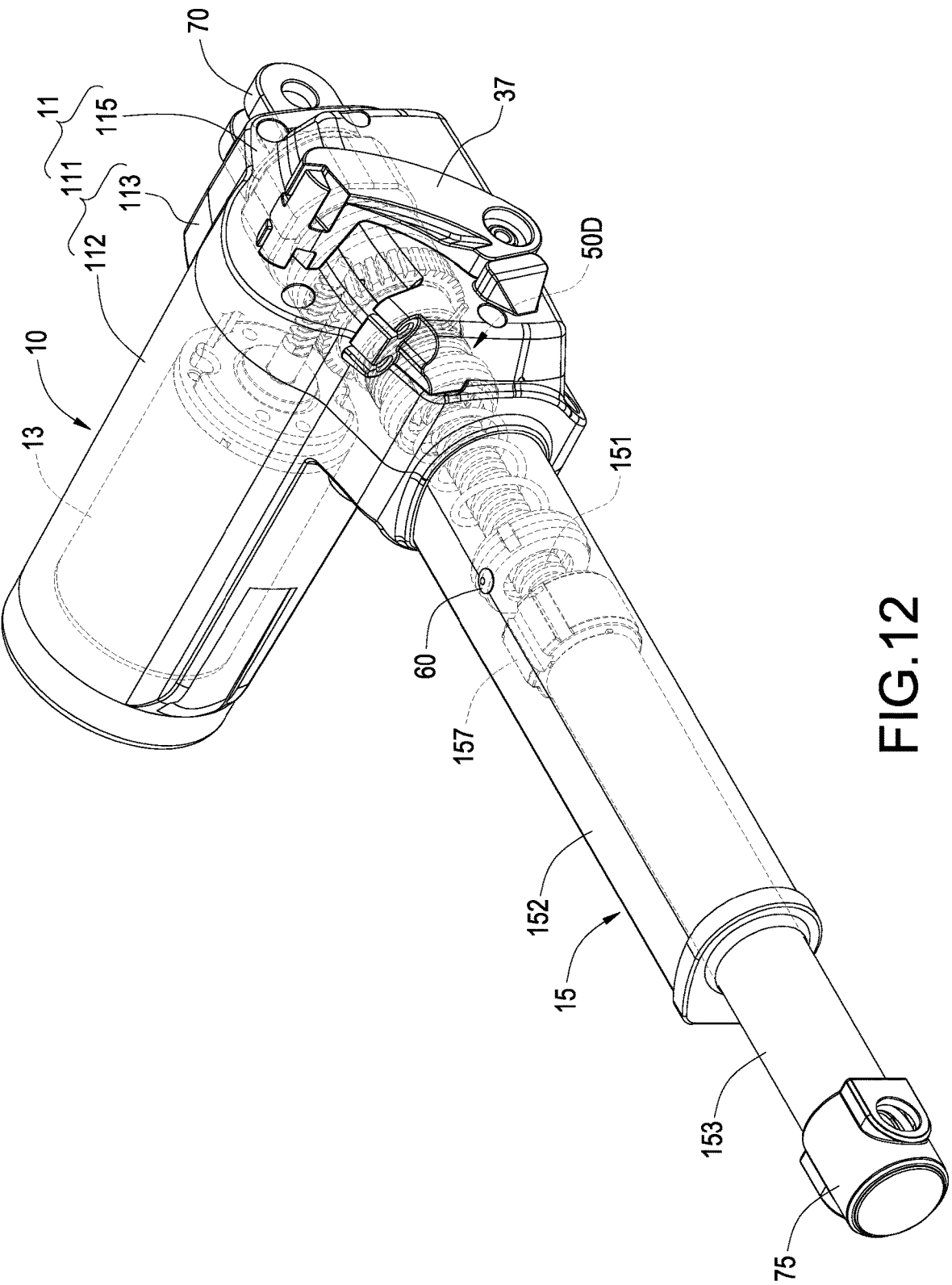
FIG. 12 is a perspective view showing the assembly according to the fifth embodiment of the present disclosure.
Figure 13:
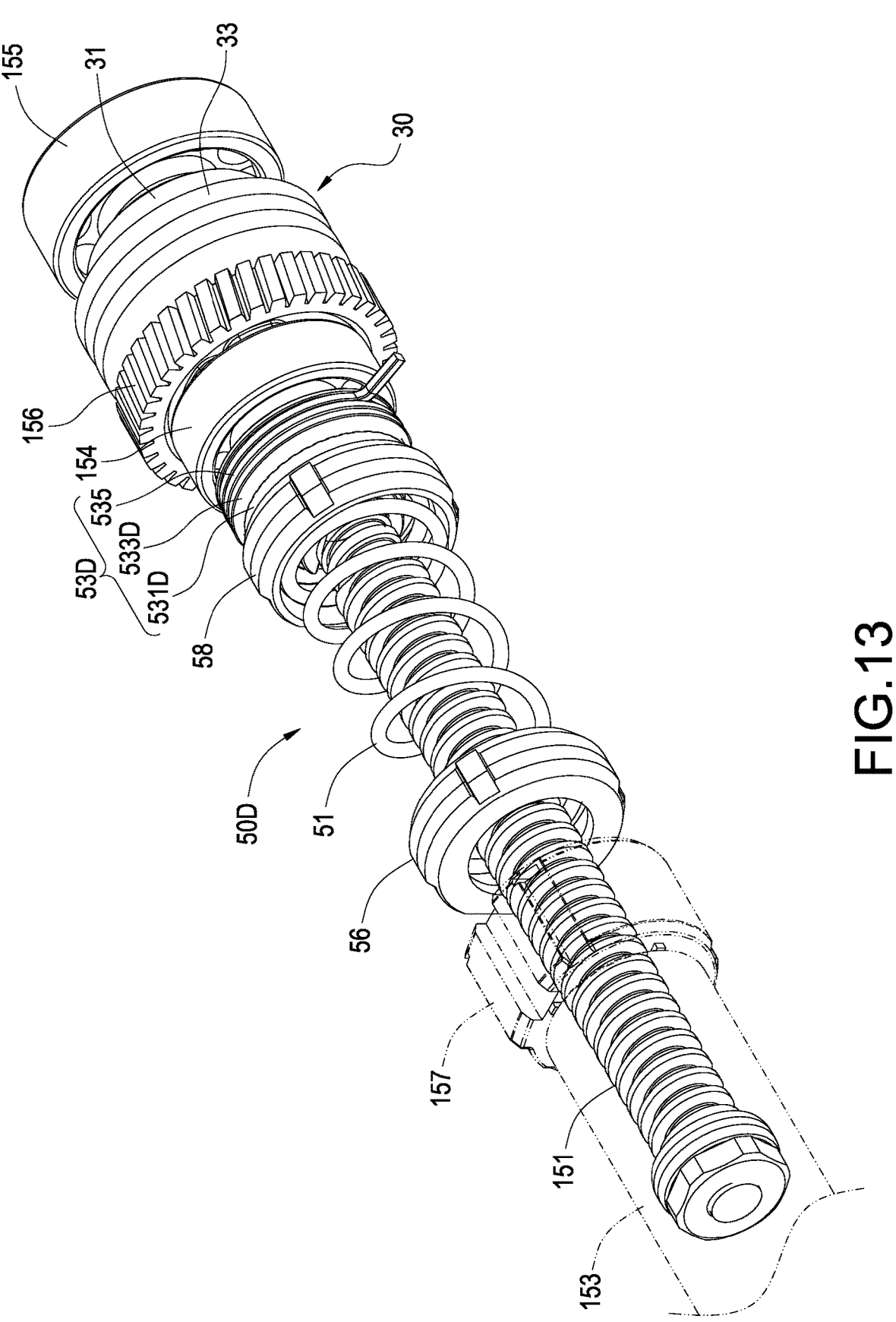
FIG. 13 is a schematic view showing the assembly of a part of the components according to the fifth embodiment of the present disclosure.
Figure 14:
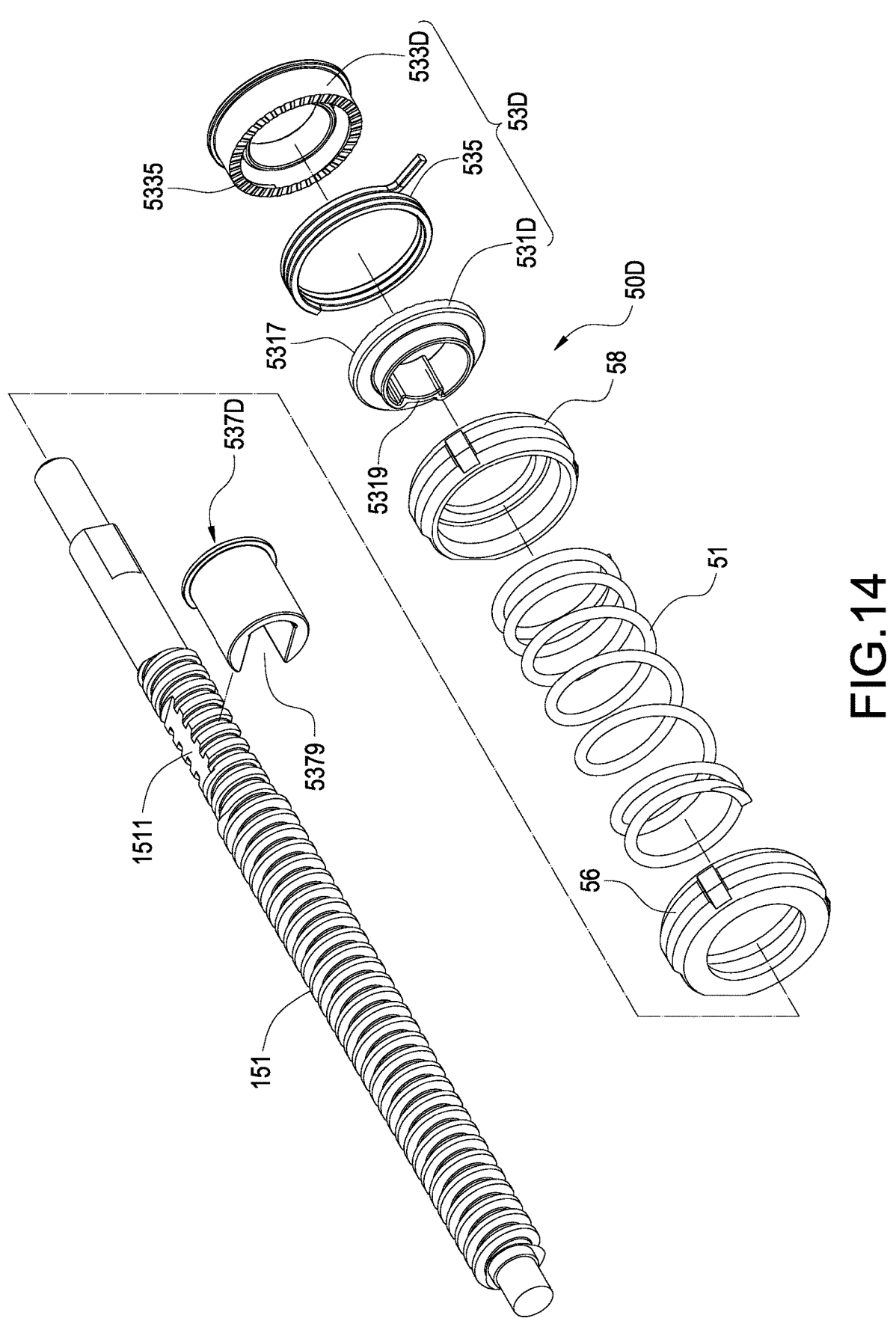
FIG. 14 is an exploded view showing the assembly of a part of the components according to the fifth embodiment of the present disclosure.
Figure 15:
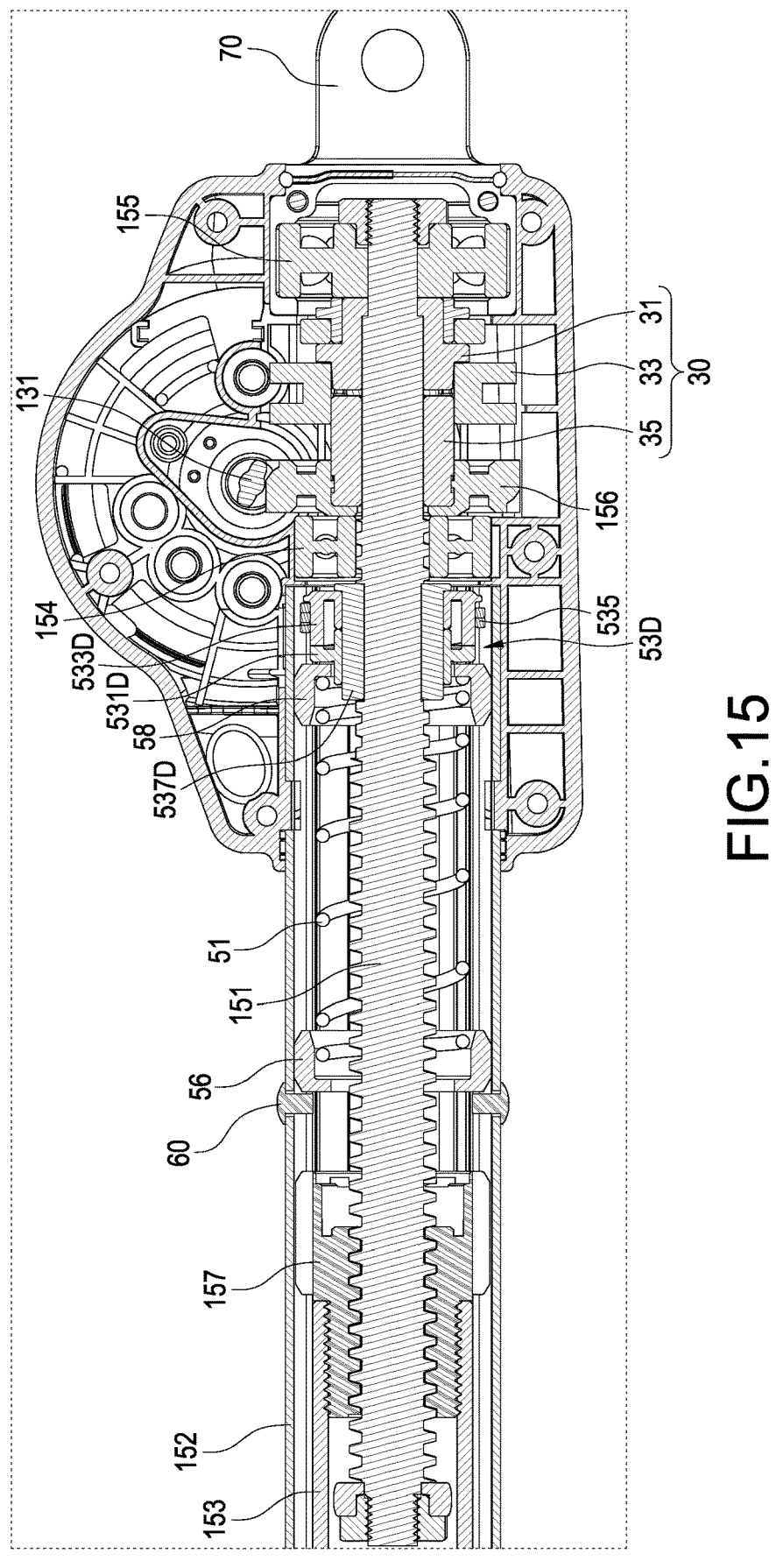
FIG. 15 is a cross-sectional view showing the assembly according to the fifth embodiment of the present disclosure.
Figure 16:
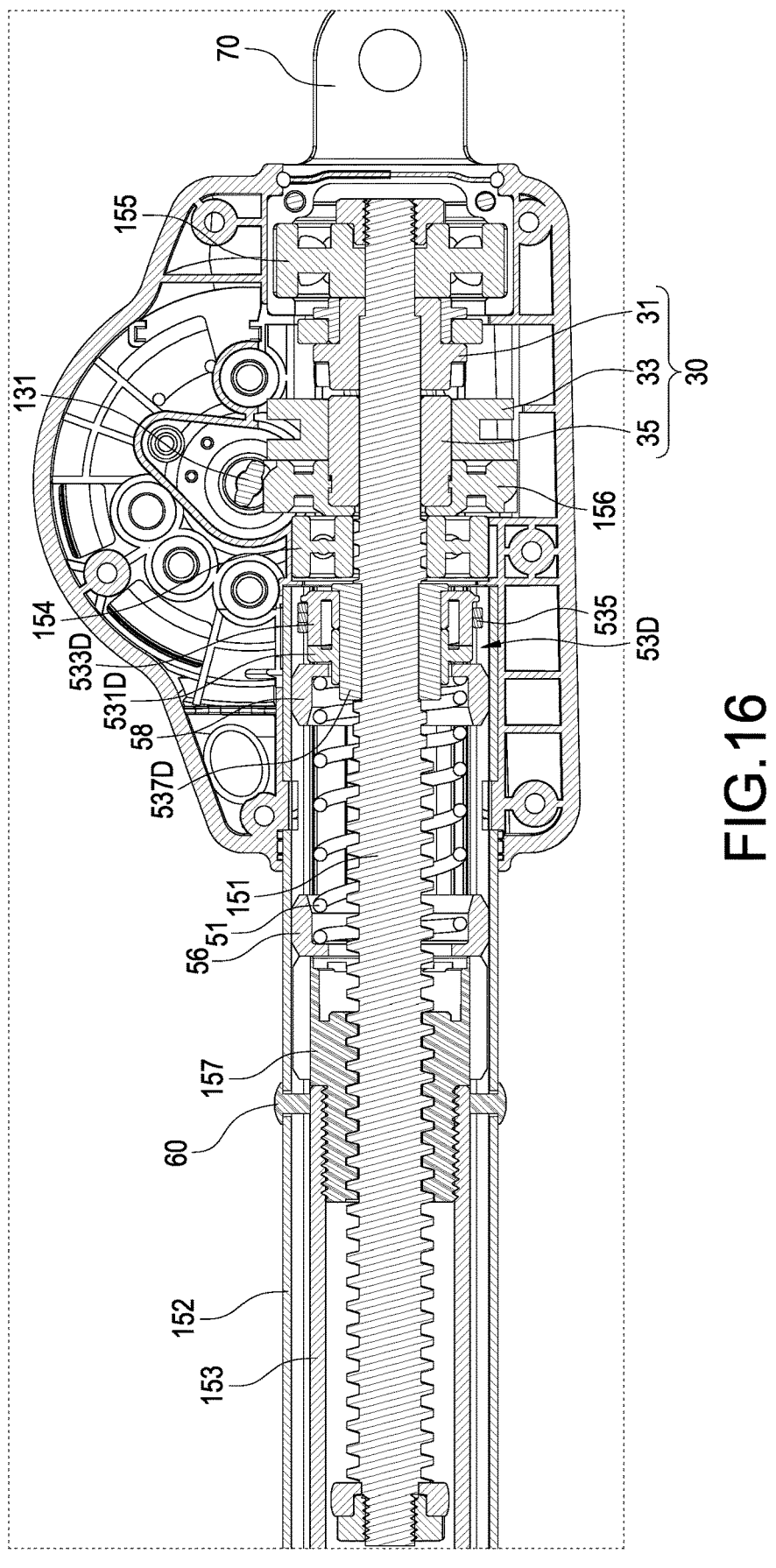
FIG. 16 is a cross-sectional view showing an operating status according to the fifth embodiment of the present disclosure.
Figure 17:
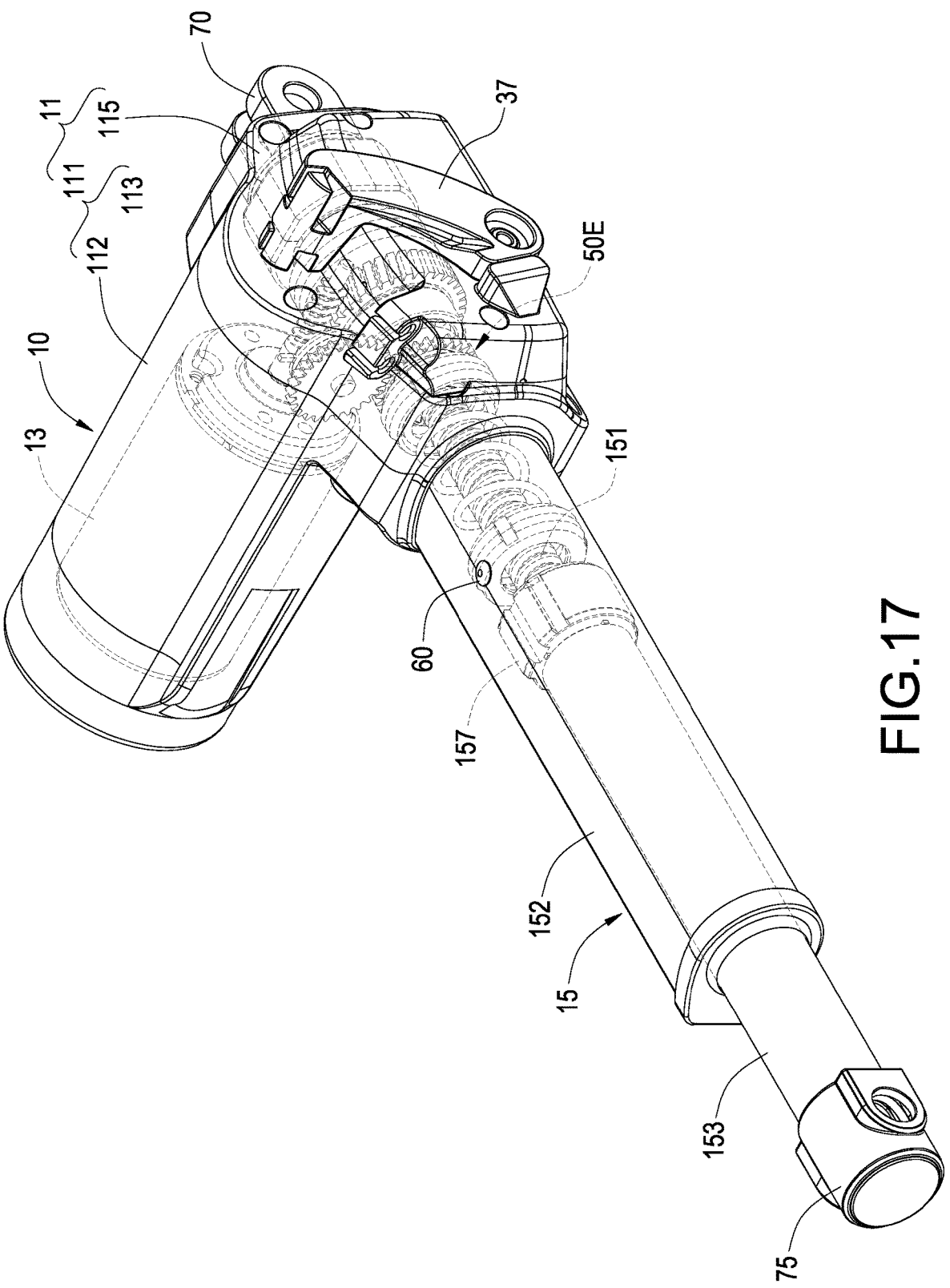
FIG. 17 is a perspective view showing the assembly according to the sixth embodiment of the present disclosure.
Figure 18:
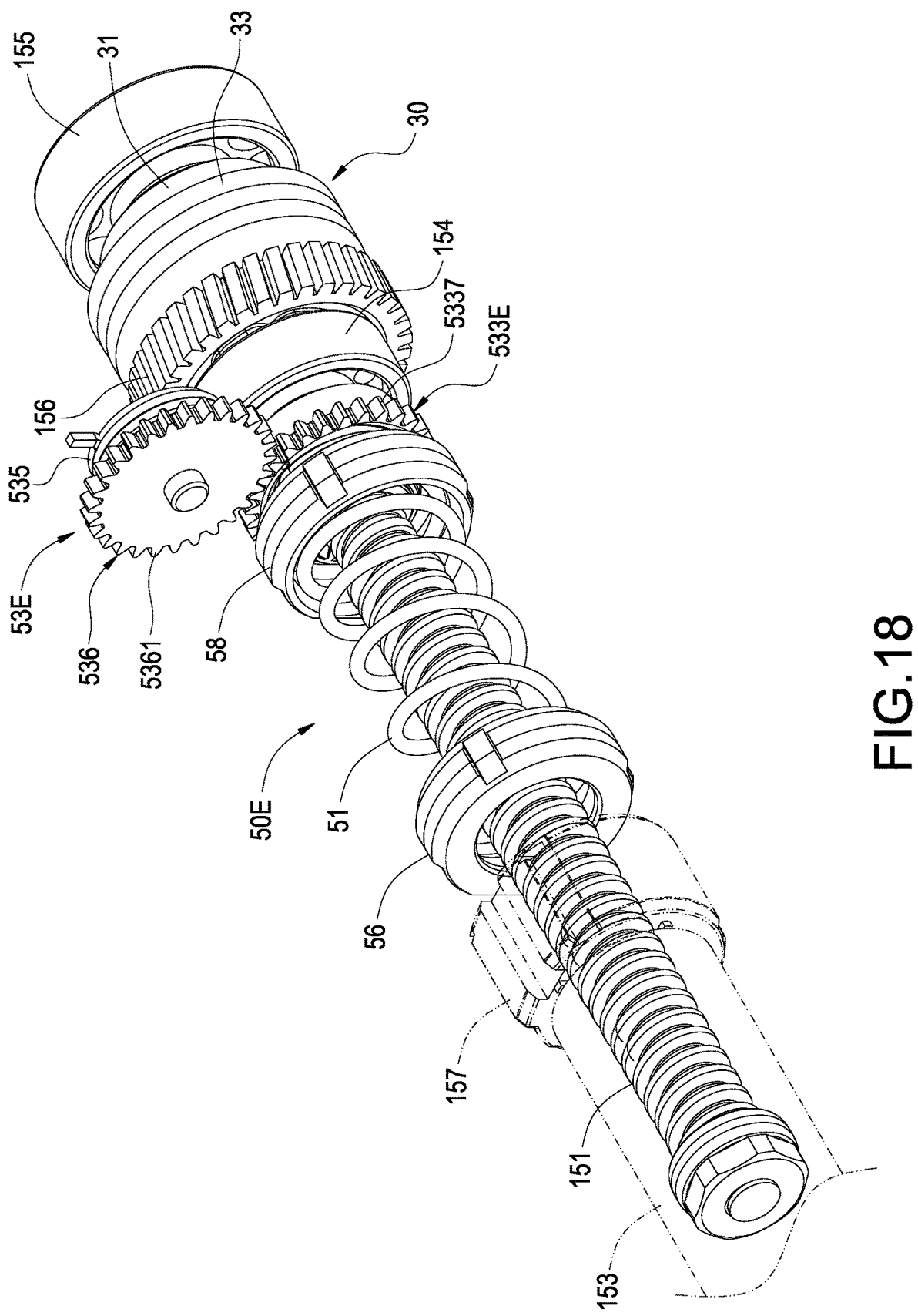
FIG. 18 is a schematic view showing the assembly of a part of the components according to the sixth embodiment of the present disclosure.
Figure 19:
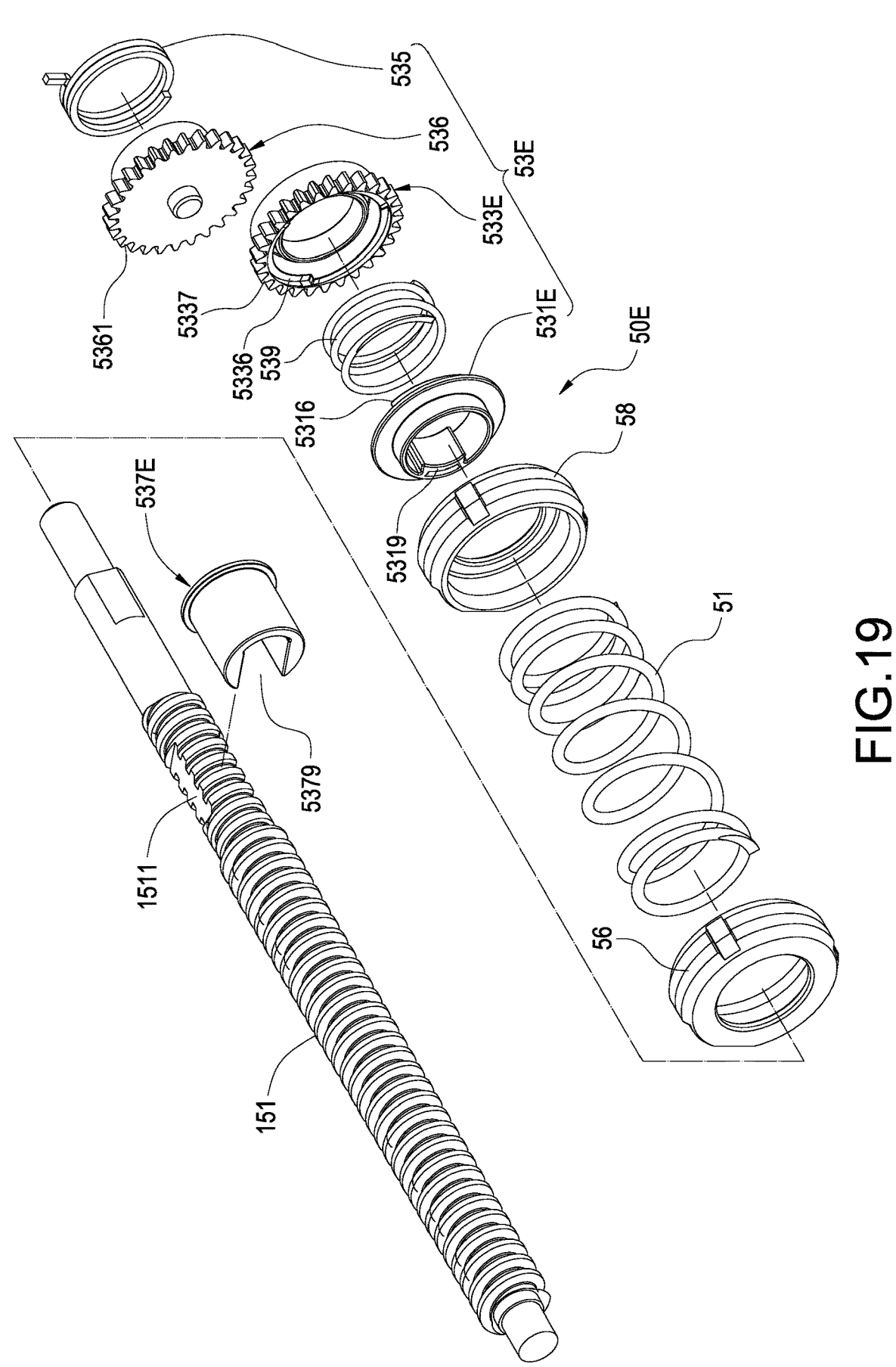
FIG. 19 is an exploded view showing the assembly of a part of the components according to the sixth embodiment of the present disclosure.
Figure 20:
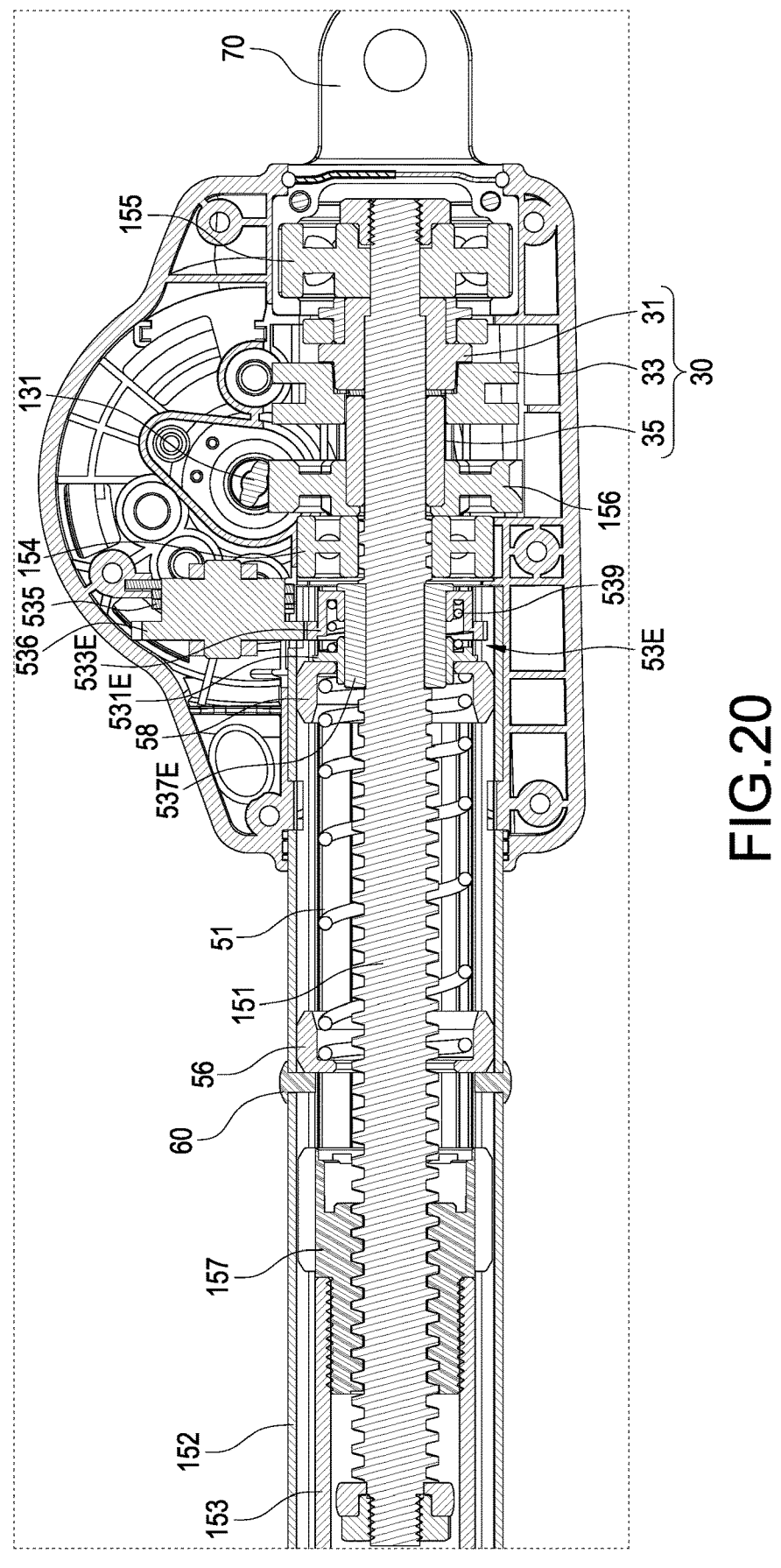
FIG. 20 is a cross-sectional view showing the assembly according to the sixth embodiment of the present disclosure.
Figure 21:
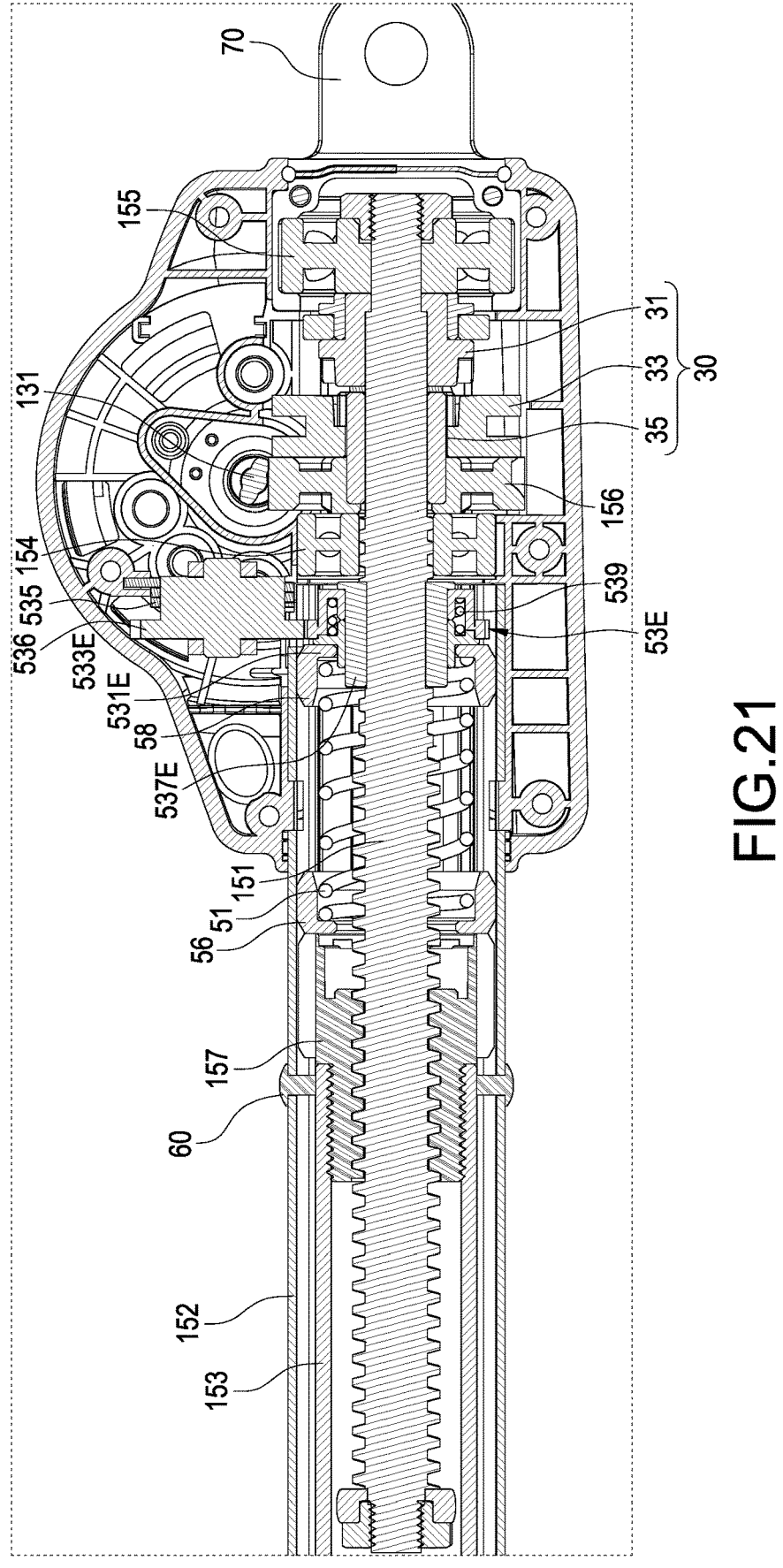
FIG. 21 is a cross-sectional view showing an operating status according to the sixth embodiment of the present disclosure.

Please refer from FIG. 11, the structure of the linear actuator with the cushion mechanism disclosed in this embodiment is substantially the same as that of the linear actuator with the cushion mechanism disclosed in the aforesaid embodiments. The differences between this embodiment and the aforesaid embodiments are as follows. According to this embodiment, a deceleration structure 53C mainly includes a rotation gear 531C and a rotation stopping member 533C. In this embodiment, the rotation stopping member 533C is defined as a brake structure. One end of the elastic member 51 is tighten at an outer circumference of the rotation gear 531C. A position surface (not shown in figures) is formed in the rotation stopping member 533C to be mutually mounted with the surface of the lead screw 151. The rotation gear 531C is driven by the lead screw 151 to rotate with the lead screw 151. The rotation stopping member 533C is pushed by a compression force generated after the elastic member 51 is deformed to be mechanically connected to the rotation gear 531C. With a brake effect generated by the friction between the first friction surface 5314 of the rotation gear 531C and the second friction gear 5334 of the rotation stopping member 533C, the rotating speed of the lead screw 151, which is in a rotating status, is lowered or the rotation is stopped.

Please refer from FIG. 12 to FIG. 16, the differences between the linear actuator with the cushion mechanism disclosed in this embodiment and that disclosed in the first embodiment are as follows. According to this embodiment, a deceleration structure 53D mainly includes a rotation gear 531D, a rotation stopping member 533D and a brake member 535. A first concave/convex surface 5317 is formed on a distal surface of the rotation gear 531D facing toward the rotation stopping member 533D. A second concave/convex surface 5335 is formed on a distal surface of the rotation stopping member 533D facing toward the rotation gear 531D. The first concave/convex surface 5317 and the second concave/convex surface 5335 are operated to be engaged or released, thus the engaging stability between the rotation gear 531 D and the rotation stopping member 533D is enhanced.

A direction guiding unit 537D has a U-shaped notch 5379 sheathing corresponding to the first position surface 1511 of the lead screw 151, thus the direction guiding unit 537D rotates with the lead screw 151. An inner mounting block 5319 is disposed in the rotation gear 531D, the inner mounting block 5319 is moveably connected to the U-shaped notch 5379, thus the rotation gear 531D axially moves relative to the direction guiding unit 537D and rotates with the direction guiding unit 537D. The rotation stopping member 533D sheathes the direction guiding unit 537D, when the rotation gear 531D is not mechanically connected to the rotation stopping member 533D, the rotation stopping member 533D is not rotatable, thus the fabricating procedure is simplified and the complicated assembling process is also simplified.

According to this embodiment, a cushion mechanism 50D further includes a front position limiting ring 56 and a rear position limiting ring 58. The front position limiting ring 56 and the rear position limiting ring 58 respectively sheathe two ends of the elastic member 51, thus a stably positioning and fastening effect is provided to the elastic member 51.

According to this embodiment, a plurality of position limiting members 60 are further provided. Each of the position limiting members 60 passes and is fastened on the outer pipe 152, thus the moving stroke of the front position limiting ring 56 is limited. The amount of the position limiting ring 60 may be one.

Please refer from FIG. 17 to FIG. 21, the differences between the linear actuator with the cushion mechanism disclosed in this embodiment and that disclosed in the fifth embodiment are as follows. According to this embodiment, a deceleration structure 53E mainly includes a rotation gear 531E, a rotation stopping member 533E, the brake member 535 and an offset gear 536. According to this embodiment, the rotation stopping member 533E, the brake member 535 and the offset gear 536 are defined as a brake structure. The rotation gear 531E is connected to the lead screw 151 via a direction guiding unit 537E and rotates with the direction guiding unit 537E. The rotation stopping member 533E sheathes the direction guiding unit 537E. When the rotation gear 531E is not mechanically connected to the rotation stopping member 533E, the rotation stopping member 533E is not rotatable. The offset gear 536 is pivotally disposed in the case 11 of the actuator body 10 and connected to the rotation stopping member 533E. The brake member 535 sheathes the offset gear 536 and one end of the brake member 535 is fastened in the case 11 of the actuator body 10. As such, an invalid stroke of the retractable pipe 153 is shortened.

In some embodiments, the declaration structure 53E further includes a recovery member 539 disposed between the rotation gear 531E and the rotation stopping member 533E. When the rotation gear 531E is not pushed by the elastic member 51, the rotation gear 531E may be moved, and the engagement of rotation gear 531E and the rotation stopping member 533E is released.

In some embodiments, a block protrusion 5316 is disposed on a distal surface of the rotation gear 531E facing toward the rotation stopping member 533E. A block slot 5336 is formed on a distal surface of the rotation stopping member 533E facing the rotation gear 531E. The block protrusion 5316 and the block slot 5336 are operated to be engaged or separated. A plurality of first teeth 5337 are extended from a circumferential surface of the rotation stopping member 533E. A plurality of second teeth 5361 are extended from a circumferential surface of the offset gear 536. The driving and rotating effect are provided by each of the first teeth 5337 being engaged with each of the second teeth 5361.

While this disclosure has been described by means of specific embodiments, numerous modifications and variations could be made thereto by those skilled in the art without departing from the scope and spirit of this disclosure set forth in the claims.

What is claimed is:

1. A linear actuator, comprising:

an actuator body (10), comprising a motor (13), a lead screw (151), an outer pipe (152) and a retractable pipe (153), wherein the lead screw (151) is driven by the motor (13) to rotate, the outer pipe (152) sheathes at an outer side of the retractable pipe (153), and the retractable pipe (153) comprises a screw nut (157) screwed with the lead screw (151) for transmission;

a rapid release mechanism (30), disposed on the lead screw (151) to release a driving relation of the motor (13) and the lead screw (151); and a cushion mechanism (50), disposed in the actuator body (10) and comprising an elastic member (51) and a deceleration structure (53);

wherein the elastic member (51) is disposed on the lead screw (151) and located between the screw nut (157) and the deceleration structure (53), the deceleration structure (53) comprises a rotation gear (531) and a rotation stopping member (533), the rotation gear (531) is disposed on the lead screw (151) and rotates with the lead screw (151), and the rotation stopping member (533) is disposed on the lead screw (151) and corresponding to the rotation gear (531);

wherein, when the rapid release mechanism (30) is in a released status, the lead screw (151) rotates under a load from the retractable pipe (153), the screw nut (157) compresses the elastic member (51) to actuate the rotation gear (531) mechanically connected to the rotation stopping member (533), and the rotation stopping member (533) performs a brake on the rotation gear (531) to decelerate a rotation speed of the rotating lead screw (151).

2. The linear actuator according to claim 1, wherein the deceleration structure (53) further comprises a brake member (535) is disposed on the rotation stopping member (533).

3. The linear actuator according to claim 2, wherein the brake member (535) is a spring, and one end of the spring is fastened with the actuator body (10).

4. The linear actuator according to claim 1, wherein the rotation gear (531) comprises at least one convex key (5313), the rotation stopping member (533) comprises at least one key slot (5331) engageable with or releasable from the convex key (5313).

5. The linear actuator according to claim 1, wherein the deceleration structure (53) further comprises a direction guiding unit (537), the rotation gear (531) is connected to the lead screw (151) via the direction guiding unit (537), the direction guiding unit (537) comprises at least one guide strip (5375), the rotation gear (531) comprises at least one guide slot (5311) correspondingly engaged with the guide strip (5375), and the rotation stopping member (533) is disposed on the direction guiding unit (537).

6. The linear actuator according to claim 5, wherein the direction guiding unit (537) comprises a lower housing (5371) and an upper housing (5373), the upper housing (5373) is correspondingly engaged with the lower housing (5371) to sheathe the lead screw (151), the lead screw (151) comprises a first position surface (1511), the upper housing (5373) and the lower housing (5371) respectively comprise a second position surface (5377) mounted and positioned with the first position surface (1511).

7. The linear actuator according to claim 1, wherein the deceleration structure (53) further comprises a recovery member (539) disposed on the rotation gear (531), on the rotation stopping member (533), or between the rotation gear (531) and the rotation stopping member (533).

8. The linear actuator according to claim 7, wherein the recovery member (539) is a spring or a magnet (5315, 5333).

9. The linear actuator according to claim 1, wherein the cushion mechanism (50) further comprises a thrust bearing (57) disposed on the rotation gear (531).

10. The linear actuator according to claim 1, wherein the rotation gear (531A) comprises a first friction surface (5314), the rotation stopping member (533A) comprises a second friction surface (5334) driven by the first friction surface (5314) to rotate.

11. The linear actuator according to claim 1, wherein the rotation gear (531D) comprises a first concave/convex surface (5317), the rotation stopping member (533D) comprises a second concave/convex surface (5335) engageable with or releasable from the first concave/convex surface (5317).

12. The linear actuator according to claim 11, wherein the deceleration structure (53D) further comprises a direction guiding unit (537D), the rotation gear (531D) is connected to the lead screw (151) via the direction guiding unit (537D), the direction guiding unit (537D) comprises a U-shaped notch (5379), the rotation gear (531D) comprises an inner mounting block (5319) moveably connected to the U-shaped notch (5379), and the rotation stopping member (533D) is disposed on the direction guiding unit (537D).

13. The linear actuator according to claim 11, wherein the cushion mechanism (50D) further comprises a front position limiting ring (56) and a rear position limiting ring (58), and the front position limiting ring (56) and the rear position limiting ring (58) are disposed at two ends of the elastic member (51).

14. The linear actuator according to claim 13, further comprising at least one position limiting member (60) limiting a stroke of the front position limiting ring (56), and the position limiting member (60) is fastened in the outer pipe (152).

15. The linear actuator according to claim 1, further comprising at least one position limiting member (60) limiting a stroke of the elastic member (51), the cushion mechanism (50) further comprises a screw cap (55) disposed at one end of the elastic member (51) away from the deceleration structure (53), and the position limiting member (60) is fastened in the outer pipe (152).

16. The linear actuator according to claim 1, wherein the deceleration structure (53C) tightens and fastens the rotation stopping member (533C) via the elastic member (51) to perform the brake.

17. The linear actuator according to claim 1, wherein the deceleration structure (53E) further comprises a brake member (535) and an offset gear (536), the offset gear (536) is pivotally disposed in the actuator body (10) and connected to the rotation stopping member (533E), the brake member (535) sheathes the offset gear (536) and one end thereof is fastened in the actuator body (10).

18. The linear actuator according to claim 17, wherein the deceleration structure (53E) further comprises a recovery member (539) disposed between the rotation gear (531E) and the rotation stopping member (533E).

19. The linear actuator according to claim 17, wherein the rotation gear (531E) comprises a block protrusion (5316), the rotation stopping member (533E) comprises a block slot (5336) and a plurality of first teeth (5337), the offset gear (536) comprises a plurality of second teeth (5361) engaged and rotatable with each of the first teeth (5337), the block protrusion (5316) is correspondingly engageable with and releasable from the block slot (5336).

20. A linear actuator, comprising:

an actuator body (10), comprising a motor (13), a lead screw (151) and a retractable pipe (153), wherein the lead screw (151) is driven by the motor (13) to rotate, the retractable pipe (153) comprises a screw nut (157) screwed with the lead screw (151) for transmission;

a rapid release mechanism (30), disposed on the lead screw (151) to release a driving relation of the motor (13) and the lead screw (151); and a cushion mechanism (50), disposed in the actuator body (10) and comprising an elastic member (51) and a deceleration structure (53), wherein the elastic member (51) is disposed on the lead screw (151) and located between the screw nut (157) and the deceleration structure (53), and the deceleration structure (53) comprises a rotation gear (531) driven by the lead screw (151) and a brake structure disposed corresponding to the rotation gear (531);

wherein, when the screw nut (157) compresses the elastic member (51) and the elastic member (51) is deformed to make the rotation gear (531) be mechanically connected to the brake structure, a rotation speed of the rotating lead screw (151) is decelerated via the brake structure braking the rotation gear (531).

21. The linear actuator according to claim 20, wherein the brake structure comprises a rotation stopping member (533, 533D) and a brake member (535), the brake member (535) is disposed on the rotation stopping member (533, 533D), the rotation stopping member (533, 533D) is restrained by the brake member (535) and does not rotate with the lead screw 151, and the rotation stopping member (533, 533D) is disposed corresponding to and operably engaged with or released from the rotation gear (531, 531D).

22. The linear actuator according to claim 20, wherein the brake structure comprises a rotation stopping member (533C), one end of the rotation stopping member (533C) is fastened with the elastic member (51), and another end of the rotation stopping member (533C) is disposed corresponding to and operably engaged with or released from the rotation gear (531C).

23. The linear actuator according to claim 20, wherein the brake structure comprises a rotation stopping member (533E), a brake member (535) and an offset gear (536), the rotation stopping member (533E) is disposed corresponding to and operably engaged with or released from the rotation gear (531E), the brake member (535) is disposed on the offset gear (536), and the offset gear (536) is pivotally disposed in the actuator body (10) and connected to the rotation stopping member (533E).

24. A linear actuator, comprising:

an actuator body (10), comprising a motor (13), a lead screw (151) and a retractable pipe (153), wherein the lead screw (151) is driven by the motor (13) to rotate, and the retractable pipe (153) comprises a screw nut (157) screwed with the lead screw (151) for transmission; and a cushion mechanism (50), disposed in the actuator body (10) and comprising an elastic member (51) and a deceleration structure (53), wherein the elastic member (51) is disposed on the lead screw (151) and located between the screw nut (157) and the deceleration structure (53), and the deceleration structure (53) comprises a rotation gear (531) driven by the lead screw (151) and a brake structure disposed corresponding to the rotation gear (531);

wherein, when the screw nut (157) compresses the elastic member (51) and the elastic member (51) is deformed to make the rotation gear (531) be mechanically connected to the brake structure, a rotation speed of the rotating lead screw (151) is decelerated via the brake structure braking the rotation gear (531).

\* \* \* \* \*